(12) United States Patent
Cheon et al.

(10) Patent No.: US 10,136,149 B2
(45) Date of Patent: *Nov. 20, 2018

(54) METHOD AND APPARATUS FOR ENCODING RESIDUAL BLOCK, AND METHOD AND APPARATUS FOR DECODING RESIDUAL BLOCK

(71) Applicant: SAMSUNG ELECTRONICS CO., LTD., Suwon-si (KR)

(72) Inventors: Min-su Cheon, Suwon-si (KR);
Jung-hye Min, Suwon-si (KR);
Woo-jin Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/323,424

(22) Filed: Jul. 3, 2014

(65) Prior Publication Data

US 2014/0314149 A1    Oct. 23, 2014

Related U.S. Application Data

(63) Continuation of application No. 12/914,248, filed on Oct. 28, 2010, now Pat. No. 8,811,479.

(30) Foreign Application Priority Data

Oct. 28, 2009    (KR) ........................ 10-2009-0102818

(51) Int. Cl.
*H04N 19/61*    (2014.01)
*H04N 19/44*    (2014.01)
(Continued)

(52) U.S. Cl.
CPC ........... *H04N 19/44* (2014.11); *H04N 19/109* (2014.11); *H04N 19/119* (2014.11); *H04N 19/13* (2014.11);
(Continued)

(58) Field of Classification Search
CPC ......... H04N 19/44; H04N 19/61; H04N 19/63
(Continued)

(56) References Cited

U.S. PATENT DOCUMENTS 4,591,907 A    5/1986    Catros
5,021,891 A    6/1991    Lee
(Continued)

FOREIGN PATENT DOCUMENTS

CA    2 738 504 A1    4/2010
CA    2883923 A1    5/2011
(Continued)

OTHER PUBLICATIONS

International Search Report dated Jun. 15, 2011, in corresponding Application PCT/KR2010/007486.
(Continued)

*Primary Examiner* — On S Mung
(74) *Attorney, Agent, or Firm* — Sughrue Mion, PLLC

(57) ABSTRACT

A decoding apparatus includes a splitter which splits the image into a plurality of maximum coding units, hierarchically splits a maximum coding unit among the plurality of maximum coding units into a plurality of coding units, and determines one or more transformation residual blocks from a coding unit among the plurality of coding units, wherein the one or more transformation residual blocks include sub residual blocks, a parser which obtains an effective coefficient flag of a sub residual block among the sub residual blocks from a bitstream, the effective coefficient flag of the sub residual block indicating whether at least one non-zero effective transformation coefficient exists in the sub residual block, and when the effective coefficient flag indicates that at least one non-zero transformation coefficient exists in the sub residual block, obtains transformation coefficients of the sub residual block based on location information of the
(Continued)

non-zero transformation coefficient and level information of the non-zero transformation coefficient obtained from the bitstream, and an inverse-transformer which performs inverse-transformation on a transformation residual block including the sub residual block based on the transformation coefficients of the sub residual block.

1 Claim, 22 Drawing Sheets

(51) Int. Cl.
| | |
|---|---|
| H04N 19/176 | (2014.01) |
| H04N 19/70 | (2014.01) |
| H04N 19/46 | (2014.01) |
| H04N 19/119 | (2014.01) |
| H04N 19/136 | (2014.01) |
| H04N 19/18 | (2014.01) |
| H04N 19/13 | (2014.01) |
| H04N 19/60 | (2014.01) |
| H04N 19/635 | (2014.01) |
| H04N 19/63 | (2014.01) |
| H04N 19/109 | (2014.01) |
| H04N 19/96 | (2014.01) |

(52) U.S. Cl.
CPC ......... *H04N 19/136* (2014.11); *H04N 19/176* (2014.11); *H04N 19/18* (2014.11); *H04N 19/46* (2014.11); *H04N 19/60* (2014.11); *H04N 19/61* (2014.11); *H04N 19/63* (2014.11); *H04N 19/635* (2014.11); *H04N 19/70* (2014.11); *H04N 19/96* (2014.11)

(58) Field of Classification Search
USPC ........................................ 375/240.12, 240.25
See application file for complete search history.

(56) References Cited

U.S. PATENT DOCUMENTS

| | | | |
|---|---|---|---|
| 5,657,085 | A | 8/1997 | Katto |
| 5,748,244 | A | 5/1998 | Jung |
| 5,808,683 | A | 9/1998 | Tong et al. |
| 6,356,213 | B1 | 3/2002 | Huang et al. |
| 6,625,217 | B1 | 9/2003 | Jacquin et al. |
| 6,795,584 | B2 | 9/2004 | Karczewicz et al. |
| 8,422,808 | B2 | 4/2013 | Adachi et al. |
| 8,463,061 | B2 | 6/2013 | Takada |
| 8,483,282 | B2 | 7/2013 | Karczewicz et al. |
| 2004/0066974 | A1 | 4/2004 | Karczewicz et al. |
| 2004/0114683 | A1 | 6/2004 | Schwarz et al. |
| 2005/0123207 | A1* | 6/2005 | Marpe ................. H04N 19/196 382/239 |
| 2005/0175250 | A1 | 8/2005 | Watanabe et al. |
| 2006/0078049 | A1* | 4/2006 | Bao ....................... H04N 19/13 375/240.11 |
| 2006/0088096 | A1 | 4/2006 | Han et al. |
| 2006/0153294 | A1 | 7/2006 | Wang et al. |
| 2007/0047653 | A1 | 3/2007 | Kim et al. |
| 2007/0248161 | A1 | 10/2007 | Haskell et al. |
| 2008/0219578 | A1 | 9/2008 | Lee |
| 2008/0232705 | A1* | 9/2008 | Sohn ................ H04N 19/00569 382/238 |
| 2008/0246637 | A1 | 10/2008 | Chen et al. |
| 2008/0279465 | A1 | 11/2008 | Raveendran et al. |
| 2008/0310507 | A1* | 12/2008 | Ye ..................... H04N 19/00812 375/240.12 |
| 2009/0080534 | A1 | 3/2009 | Sekiguchi et al. |
| 2009/0097568 | A1* | 4/2009 | Karczewicz ........... H04N 19/70 375/240.24 |
| 2009/0210219 | A1 | 8/2009 | Sung et al. |
| 2009/0219988 | A1 | 9/2009 | Cammas et al. |
| 2009/0225843 | A1 | 9/2009 | Lee et al. |
| 2009/0226103 | A1 | 9/2009 | Choi et al. |
| 2009/0232204 | A1 | 9/2009 | Lee et al. |

FOREIGN PATENT DOCUMENTS

| | | |
|---|---|---|
| CA | 2883978 A1 | 5/2011 |
| CN | 1497503 A | 5/2004 |
| CN | 104796708 A | 7/2015 |
| EP | 1408695 A2 | 4/2004 |
| EP | 2106145 A2 | 9/2009 |
| JP | 02-239776 A | 9/1990 |
| JP | 08-280021 A | 10/1996 |
| JP | 2005-530375 A | 10/2005 |
| JP | 2006-501740 A | 1/2006 |
| JP | 2008-141382 A | 6/2008 |
| JP | 2011-501535 A | 1/2011 |
| JP | 2011-049816 A | 3/2011 |
| KR | 10-2008-0092940 A | 10/2008 |
| KR | 10-2009-0097013 A | 9/2009 |
| KR | 10-2009-0099236 A | 9/2009 |
| RU | 2209527 C2 | 7/2003 |
| RU | 2341035 C1 | 12/2008 |
| RU | 2368005 C2 | 9/2009 |
| WO | 2007077178 A1 | 7/2007 |
| WO | 2008/007760 A1 | 1/2008 |
| WO | 2009/049260 A2 | 4/2009 |

OTHER PUBLICATIONS

Communication dated Mar. 22, 2013 from the Russian Patent Office in counterpart application No. 2012121859/08(033061).
Communication dated Jul. 22, 2013 issued by the Mexican Institute of Industrial Property in counterpart Mexican Application No. MX/A/2012/004803.
Communication dated Jul. 19, 2013 issued by the Australian Patent Office in counterpart Australian Application No. 2010313967.
Communication dated Jan. 23, 2014, issued by the Mexican Institute of Industrial Property in counterpart Mexican Application No. MX/a/2012/004803.
Communication dated Apr. 14, 2014, issued by the Korean Intellectual Property Office in counterpart Korean Application No. 10-2009-0102818.
Communication dated Apr. 28, 2014, issued by the Canadian Intellectual Property Office in counterpart Canadian Application No. 2,777,587.
Topiwala, et al.; "Local Zerotree Codling", Institute of Electrical and Electronics Engineers, International Conference, Oct. 1999, vol. 2, 4 pages total.
Marpe, et al.; "Context-Based Adaptive Binary Arithmetic Coding in the H.264/AVC Video Compression Standard", IEEE Transactions on Circuits and Systems for Video Technology, Jul. 2003, vol. 13, No. 7, 17 pages total.
Said, et al.; "A New, Fast, and Efficient Image Codec Based on Set Partitioning in Hierarchical Trees", IEEE Transactions on Circuits and Systems for Video Technology, Jun. 1996, vol. 6, No. 3, 8 pages total.
Richardson, "Chapter 3: Video Coding Concepts", H.264 and MPEG-4 Video Compression: Video Coding for Next-Generation Multimedia, Oct. 2003, 57 pages total.
Wien, et al.; "Hybrid Video Coding Using Variable Size Block Transforms", Proceedings of SPIE, Jan. 2002, vol. 4671, 12 pages total.
Kim, et al.; "Enlarging MB Size for High Fidelity Video Coding Beyond HD", Video Coding Experts Group (VCEG), Oct. 2008, 6 pages total.
Communication dated May 29, 2015, issued by the European Patent Office in counterpart European Application No. 10827104.0.
Communication dated May 29, 2015, issued by the European Patent Office in counterpart European Application No. 15158640.1.
Communication dated May 29, 2015, issued by the European Patent Office in counterpart European Application No. 15158612.0.
Communication dated May 29, 2015, issued by the European Patent Office in counterpart European Application No. 15158613.8.

(56) References Cited

OTHER PUBLICATIONS

Communication dated May 29, 2015, issued by the European Patent Office in counterpart European Application No. 15158614.6.
Communication dated Jul. 16, 2015, issued by the Korean Intellectual Property Office in counterpart Korean Application No. 10-2014-0148719.
Communication dated Aug. 3, 2015, issued by the Korean Intellectual Property Office in counterpart Korean Application No. 10-2015-0047489.
Communication dated Jun. 2, 2015, issued by the Russian Federal Service for Intellectual Property in counterpart Russian Application No. 2013128302.
Communication dated Oct. 27, 2015, issued by the Japanese Patent Office in counterpart Japanese Application No. 2015-043127.
Communication dated Oct. 27, 2015, issued by the Japanese Patent Office in counterpart Japanese Application No. 2015-043128.
Communication dated Oct. 27, 2015, issued by the Japanese Patent Office in counterpart Japanese Application No. 2015-043129.
Communication dated Oct. 13, 2015, issued by the Japanese Patent Office in counterpart Japanese Application No. 2015-005065.
Communication from the Russian Patent Office dated Apr. 13, 2016 in a counterpart Russian application No. 2015108352.
Communication from the Russian Patent Office dated Apr. 13, 2016 in a counterpart Russian application No. 2015108338.
Communication from the Russian Patent Office dated Apr. 13, 2016 in a counterpart Russian application No. 2015108351.
Communication dated Jul. 4, 2016 issued by the Canadian Patent Office in counterpart Canadian Patent Application No. 2,883,913.
Communication dated Oct. 25, 2016, issued by the State Intellectual Property Office of the People's Republic of China in counterpart Chinese Patent Application No. 201510148781.3.
Communication dated Nov. 10, 2016, issued by the Canadian Intellectual Property Office in counterpart Canadian Patent Application No. 2,883,923.
Communication dated Dec. 13, 2016, issued by the Canadian Intellectual Property Office in counterpart Canadian Patent Application No. 2,883,978.
Communication dated Dec. 5, 2017, issued by The State Intellectual Property Office of P.R. China in counterpart Chinese application No. 201510150297.4.
Communication dated Nov. 6, 2017, issued by the Canadian Intellectual Property Office in counterpart Canadian application No. 2,883,920.
Communication dated Dec. 8, 2017, issued by the Indian Patent Office in counterpart Indian application No. 1264/MUMNP/2012.
Communication dated Jan. 31, 2018, issued by the State Intellectual Property Office in counterpart Chinese application No. 201510149521.8.
Communication, Issued by the Korean Intellectual Property Office, dated Jul. 29, 2014, in counterpart Korean Application No. 10-2009-0102818.
Communication, Issued by the Australian Intellectual Property Office, dated Aug. 25, 2014, in counterpart Australian Application No. 2010313967.
Communication, Issued by the State Intellectual Property Office of P.R. China, dated Jun. 26, 2014, in counterpart Chinese Application No. 201080049289.6.

* cited by examiner

CODING UNITS (1010)

✗ : EFFECTIVE TRANSFORMATION COEFFICIENT

✗ : EFFECTIVE TRANSFORMATION COEFFICIENT

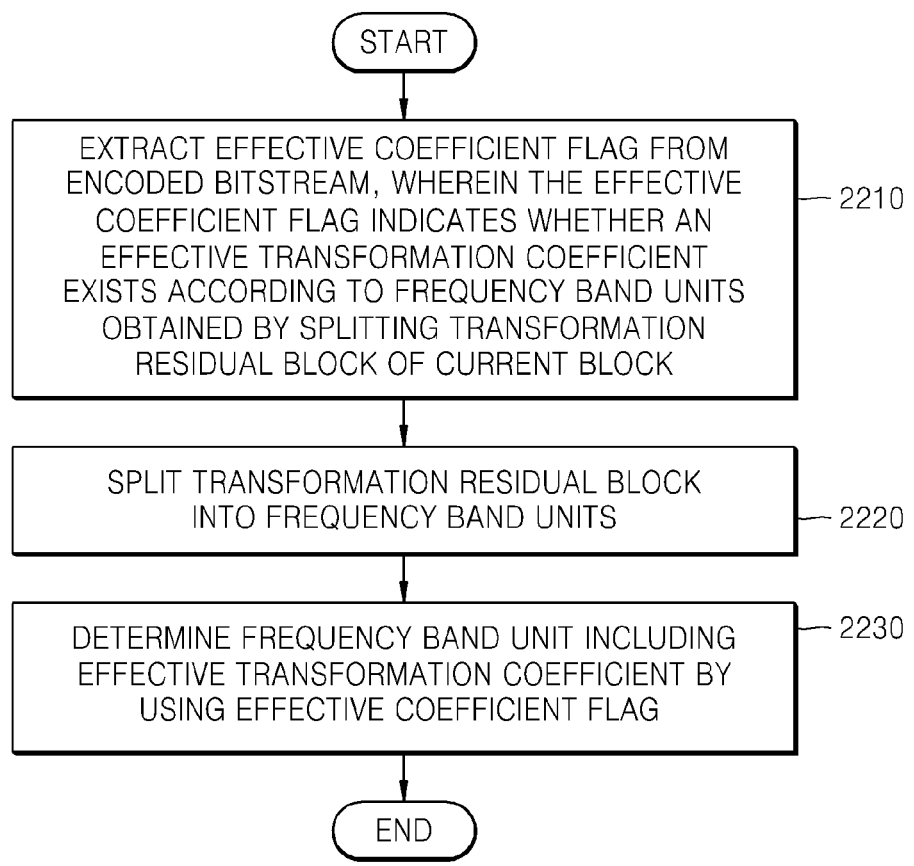

METHOD AND APPARATUS FOR ENCODING RESIDUAL BLOCK, AND METHOD AND APPARATUS FOR DECODING RESIDUAL BLOCK

CROSS-REFERENCE TO RELATED PATENT APPLICATIONS

This application is a continuation of U.S. patent application Ser. No. 12/914,248 filed Oct. 28, 2010, which claims priority from Korean Patent Application No. 10-2009-0102818, filed on Oct. 28, 2009 in the Korean Intellectual Property Office, the entire disclosures of the prior applications are incorporated herein by reference in their entireties.

BACKGROUND

1. Field

Apparatuses and methods consistent with exemplary embodiments relate to encoding and decoding, and more particularly, to encoding and decoding of a residual block.

2. Description of the Related Art

As hardware for reproducing and storing high resolution or high quality video content is being developed and supplied, a need for a video codec for effectively encoding or decoding the high resolution or high quality video content is increasing. In a related art video codec, a video is encoded according to a limited prediction mode based on a macroblock having a predetermined size. Also, the related art video codec encodes a residual block by using a transformation unit having a small size, such as 4×4 or 8×8.

SUMMARY

Exemplary embodiments provide a method and apparatus for efficiently encoding and decoding effective transformation coefficient information in a transformation residual block having a large size.

According to an aspect of an exemplary embodiment, there is provided a method of encoding a residual block, the method including: generating a prediction block of a current block; generating a residual block based on a difference between the prediction block and the current block; generating a transformation residual block by transforming the residual block to a frequency domain; splitting the transformation residual block into frequency band units; and encoding effective coefficient flags indicating frequency band units, of the split frequency band units, in which nonzero effective transformation coefficients exist.

According to an aspect of another exemplary embodiment, there is provided an apparatus for encoding a residual block, the apparatus including: a predictor which generates a prediction block of a current block; a subtractor which generates a residual block based on a difference between the prediction block and the current block; a transformer which generates a transformation residual block by transforming the residual block to a frequency domain; an entropy encoder which splits the transformation residual block into frequency band units, and encodes effective coefficient flags indicating frequency band units, of the split frequency band units, in which nonzero effective transformation coefficients exist.

According to an aspect of another exemplary embodiment, there is provided a method of decoding a residual block, the method including: extracting effective coefficient flags from an encoded bitstream, the effective coefficient flags indicating frequency band units in which nonzero effective transformation coefficients exist, from among split frequency band units obtained by splitting a transformation residual block of a current block; splitting the transformation residual block into the split frequency band units; and determining a frequency band unit having an effective transformation coefficient from among the split frequency band units obtained by splitting the transformation residual block, by using the extracted effective coefficient flags.

According to an aspect of another exemplary embodiment, there is provided an apparatus for decoding a residual block, the apparatus including: a parser which extracts effective coefficient flags from an encoded bitstream, the effective coefficient flags indicating frequency band units in which nonzero effective transformation coefficients exist, from among split frequency band units obtained by splitting a transformation residual block of a current block; and an entropy decoder which splits the transformation residual block into the split frequency band units, and determines a frequency band unit having an effective transformation coefficient from among the split frequency band units obtained by splitting the transformation residual block, by using the extracted effective coefficient flags.

According to an aspect of another exemplary embodiment, there is provided a method of encoding a residual block, the method including: generating a transformation residual block by transforming a residual block to a frequency domain; splitting the transformation residual block into frequency band units; and encoding effective coefficient flags indicating frequency band units, of the frequency band units, in which nonzero effective transformation coefficients exist.

BRIEF DESCRIPTION OF THE DRAWINGS

The above and/or other aspects will become more apparent by describing in detail exemplary embodiments with reference to the attached drawings in which:

FIGS. 16A through 16J are diagrams for describing splitting of a transformation residual block into predetermined frequency band units, according to one or more exemplary embodiments;

FIG. 22 is a flowchart illustrating a method of decoding a residual block, according to an exemplary embodiment.

DETAILED DESCRIPTION OF EXEMPLARY EMBODIMENTS

Hereinafter, exemplary embodiments will be described more fully with reference to the accompanying drawings. It is understood that expressions such as "at least one of," when preceding a list of elements, modify the entire list of elements and do not modify the individual elements of the list.

In the exemplary embodiments, a "coding unit" is an encoding data unit in which the image data is encoded at an encoder side and an encoded data unit in which the encoded image data is decoded at a decoder side. Also, a "coded depth" refers to a depth where a coding unit is encoded.

Figure 1:
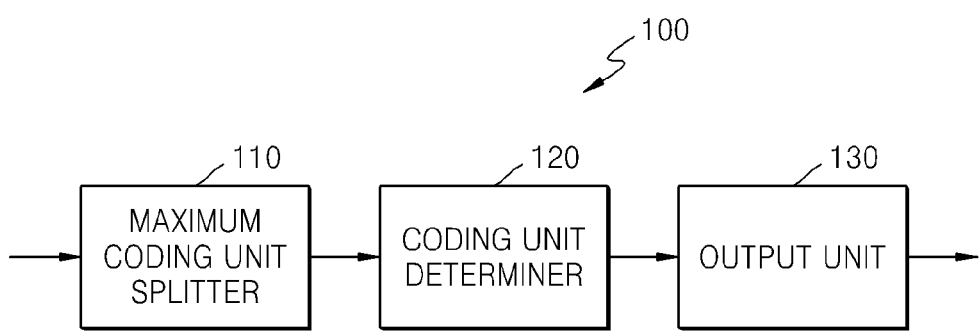
FIG. 1 is a block diagram of an apparatus for encoding a video, according to an exemplary embodiment.

FIG. 1 is a block diagram of a video encoding apparatus 100, according to an exemplary embodiment. Referring to FIG. 1, the video encoding apparatus 100 includes a maximum coding unit splitter 110, a coding unit determiner 120, and an output unit 130.

The maximum coding unit splitter 110 may split a current picture of an image based on a maximum coding unit for the current picture. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit can be hierarchically split, may be predetermined.

The coding unit determiner 120 encodes at least one split region obtained by splitting a region of the maximum coding unit according to depths, and determines a depth to output encoded image data according to the at least one split region. That is, the coding unit determiner 120 determines a coded depth by encoding the image data in the deeper coding units according to depths, based on the maximum coding unit of the current picture, and selecting a depth having the least encoding error. Thus, the encoded image data of the coding unit corresponding to the determined coded depth is output to the output unit 130. Also, the coding units corresponding to the coded depth may be regarded as encoded coding units.

The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to a same depth in one maximum coding unit, it is determined whether to split each of the coding units corresponding to the same depth to a lower depth by measuring an encoding error of the image data of each coding unit, separately. Accordingly, even when image data is included in one maximum coding unit, the image data is split to regions according to the depths and the encoding errors may differ according to regions in the one maximum coding unit, and thus the coded depths may differ according to regions in the image data. Therefore, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The coding units having a tree structure according to an exemplary embodiment include coding units corresponding to a depth determined to be the coded depth, from among deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to a number of splitting times from a maximum coding unit to a minimum coding unit. A first maximum depth according to an exemplary embodiment may denote a total number of splitting times from the maximum coding unit to the minimum coding unit. A second maximum depth according to an exemplary embodiment may denote a total number of depth levels from the maximum coding unit to the minimum coding unit. For example, when a depth of the maximum coding unit is 0, a depth of a coding unit in which the maximum coding unit is split once may be set to 1, and a depth of a coding unit in which the maximum coding unit is split twice may be set to 2. Here, if the minimum coding unit is a coding unit in which the maximum coding unit is split four times, 5 depth levels of depths 0, 1, 2, 3 and 4 exist. Thus, the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, based on the maximum coding unit. Transformation may be performed according to a method of orthogonal transformation or integer transformation.

Since the number of deeper coding units increases whenever the maximum coding unit is split according to depths, encoding such as the prediction encoding and the transformation is performed on all of the deeper coding units generated as the depth deepens. For convenience of description, the prediction encoding and the transformation will hereinafter be described based on a coding unit of a current depth, in a maximum coding unit.

The video encoding apparatus 100 may variously select at least one of a size and a shape of a data unit for encoding the image data. In order to encode the image data, operations, such as prediction encoding, transformation, and entropy encoding, may be performed, and at this time, the same data unit may be used for all operations or different data units may be used for each operation.

For example, the video encoding apparatus 100 may select a coding unit for encoding the image data and a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will be referred to as a prediction unit. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, a size of a partition may be 2N×2N, 2N×N, N×2N, or N×N. Examples of a partition type include symmetrical partitions that are obtained by symmetrically splitting at least one of a height and a width of the prediction unit, partitions obtained by asymmetrically splitting the height or the width of the prediction unit (such as 1:n or n:1), partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. In this case, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based on the coding unit for encoding the image data and on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will hereinafter be referred to as a transformation unit. A transformation depth indicating a number of splitting times to reach the transformation unit by splitting the height and the width of the coding unit may also be set in the transformation unit. For example, in a current coding unit of 2N×2N, a transformation depth may be 0 when the size of a transformation unit is also 2N×2N, may be 1 when each of the height and width of the current coding unit is split into two equal parts, totally split into $4^1$ transformation units, and the size of the transformation unit is thus N×N, and may be 2 when each of the height and width of the current coding unit is split into four equal parts, totally split into $4^2$ transformation units, and the size of the transformation unit is thus N/2×N/2. For example, the transformation unit may be set according to a hierarchical tree structure, in which a transformation unit of an upper transformation depth is split into four transformation units of a lower transformation depth according to hierarchical characteristics of a transformation depth.

Similar to the coding unit, the transformation unit in the coding unit may be recursively split into smaller sized regions, so that the transformation unit may be determined independently in units of regions. Thus, residual data in the coding unit may be divided according to the transformation having the tree structure according to transformation depths.

Encoding information according to coding units corresponding to a coded depth uses information about the coded depth and information related to prediction encoding and transformation. Accordingly, the coding unit determiner 120 determines a coded depth having a least encoding error and determines a partition type in a prediction unit, a prediction mode according to prediction units, and a size of a transformation unit for transformation.

Coding units according to a tree structure in a maximum coding unit and a method of determining a partition, according to exemplary embodiments, will be described in detail later with reference to FIGS. 3 through 12.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to the coded depth may include at least one of information about the coded depth, the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output. In this case, the split information may be defined to not split the current coding unit to a lower depth. Alternatively, if the current depth of the current coding unit is not the coded depth, the encoding is performed on the coding unit of the lower depth. In this case, the split information may be defined to split the current coding unit to obtain the coding units of the lower depth.

If the current depth is not the coded depth, encoding is performed on the coding unit that is split into the coding unit of the lower depth. In this case, since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit of the lowermost depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to coding units and encoding information according to prediction units. The encoding information according to the coding units may include the information about the prediction mode and the size of the partitions. The encoding information according to the prediction units may include information about an estimated direction of an inter mode, a reference image index of the inter mode, a motion vector, a chroma component of an intra mode, and an interpolation method of the intra mode. Also, information about a maximum size of the coding unit defined according to pictures, slices, or GOPs, and information about a maximum depth may be inserted into at least one of a Sequence Parameter Set (SPS) or a header of a bitstream.

In the video encoding apparatus 100, the deeper coding unit may be a coding unit obtained by dividing at least one of a height and a width of a coding unit of an upper depth, which is one layer above, by two. For example, when the size of the coding unit of the current depth is 2N×2N, the size of the coding unit of the lower depth may be N×N. Also, the coding unit of the current depth having the size of 2N×2N may include maximum 4 of the coding unit of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or a large amount of data is encoded in a related art macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100 according to an exemplary embodiment, image compression efficiency may be increased since a coding unit is adjusted while considering characteristics of an image and increasing a maximum size of a coding unit while considering a size of the image.

Figure 2:
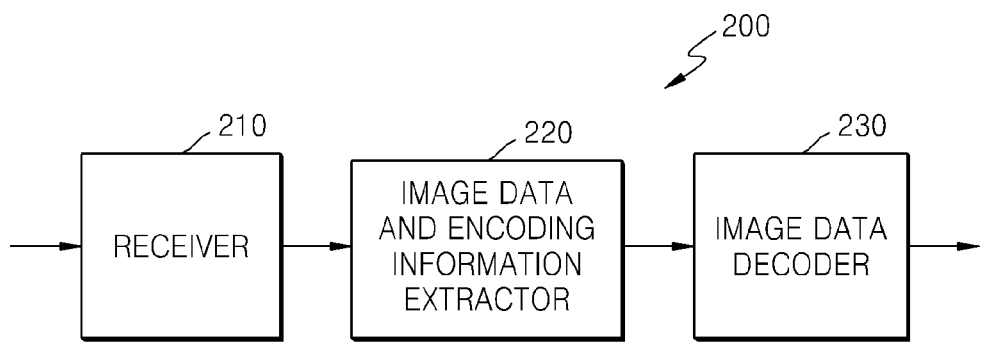
FIG. 2 is a block diagram of an apparatus for decoding a video, according to an exemplary embodiment.

FIG. 2 is a block diagram of a video decoding apparatus 200, according to an exemplary embodiment.

Referring to FIG. 2, the video decoding apparatus 200 includes a receiver 210, an image data and encoding information extractor 220, and an image data decoder 230. Definitions of various terms, such as a coding unit, a depth, a prediction unit, and a transformation unit, and information about various encoding modes for various operations of the video decoding apparatus 200 are similar to those described above with reference to FIG. 1.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture from a header about the current picture or an SPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. That is, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about at least one of a partition type of a corresponding coding unit corresponding to the coded depth, a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as a video encoding apparatus 100 according to an exemplary embodiment, repeatedly performs encoding for each deeper coding unit based on depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be the data units included in the same maximum coding unit.

The image data decoder 230 restores the current picture by decoding the image data in each maximum coding unit based on the information about the coded depth and the encoding mode according to the maximum coding units. For example, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation. Inverse transformation may be performed according to a method of inverse orthogonal transformation or inverse integer transformation.

The image data decoder 230 may perform at least one of intra prediction and motion compensation according to a partition and a prediction mode of each coding unit, based on the information about the partition type and the prediction mode of the prediction unit of the coding unit according to coded depths.

Also, the image data decoder 230 may perform inverse transformation according to each transformation unit in the coding unit, based on the information about the size of the transformation unit of the coding unit according to coded depths, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to the each coded depth in the current maximum coding unit by using at least one of the information about the partition type of the prediction unit, the prediction mode, and the size of the transformation unit for each coding unit corresponding to the coded depth, and output the image data of the current maximum coding unit.

For example, data units including the encoding information having the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 may obtain information about at least one coding unit that generates the minimum encoding error when encoding is recursively performed for each maximum coding unit, and may use the information to decode the current picture. That is, the coding units having the tree structure determined to be the optimum coding units in each maximum coding unit may be decoded. Also, the maximum size of the coding unit may be determined considering at least one of resolution and an amount of image data.

Accordingly, even if image data has high resolution and a large amount of data, the image data may be efficiently decoded and restored by using a size of a coding unit and an encoding mode, which are adaptively determined according to characteristics of the image data, and information about an optimum encoding mode received from an encoder.

A method of determining coding units having a tree structure, a prediction unit, and a transformation unit, according to one or more exemplary embodiments, will now be described with reference to FIGS. 3 through 13.

Figure 3:
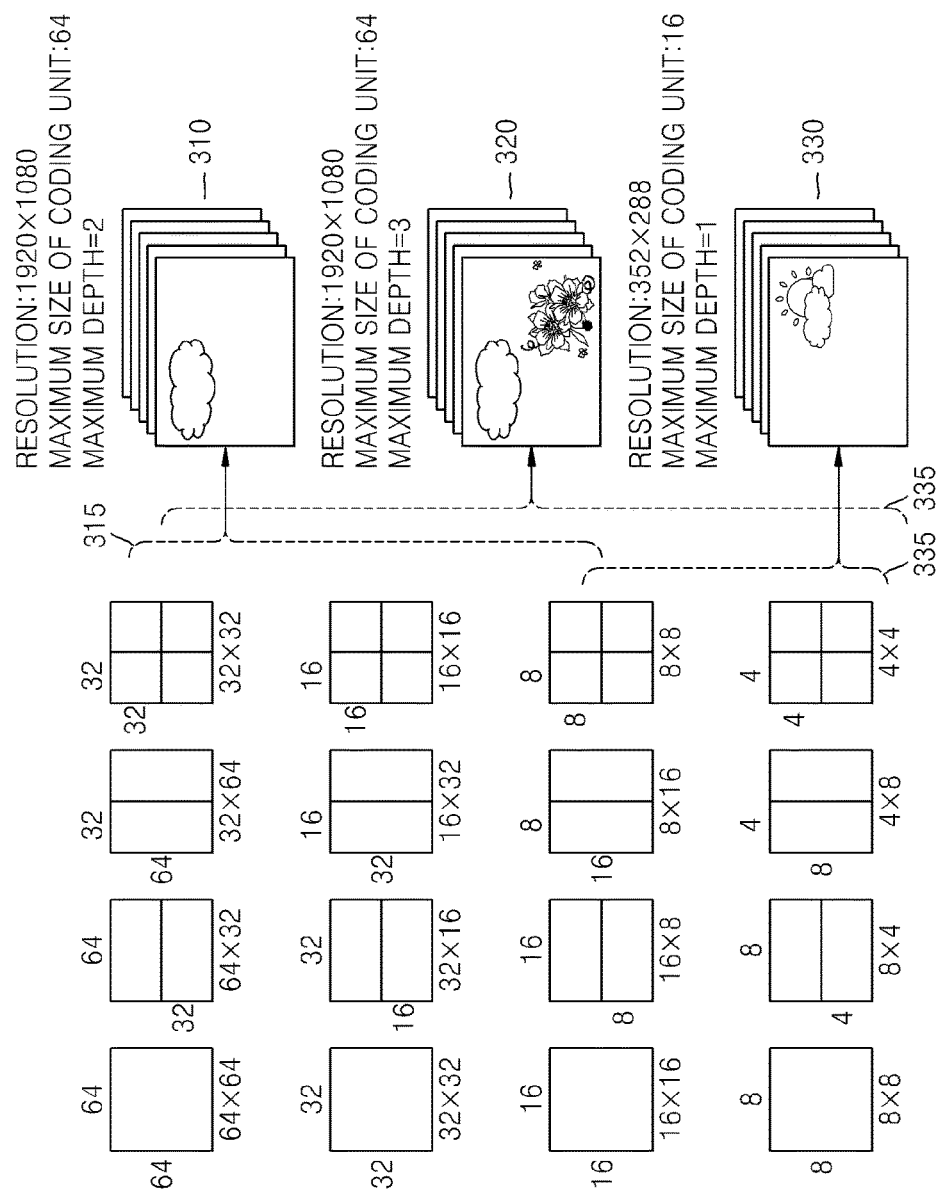
FIG. 3 is a diagram for describing a concept of coding units according to an exemplary embodiment.

FIG. 3 is a diagram for describing a concept of coding units according to an exemplary embodiment.

A size of a coding unit may be expressed in width×height. For example, the size of the coding unit may be 64×64, 32×32, 16×16, or 8×8. A coding unit of 64×64 may be split into partitions of 64×64, 64×32, 32×64, or 32×32, a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

Referring to FIG. 3, there is exemplarily provided first video data 310 with a resolution of 1920×1080, and a coding unit with a maximum size of 64 and a maximum depth of 2. Furthermore, there is exemplarily provided second video data 320 with a resolution of 1920×1080, and a coding unit with a maximum size of 64 and a maximum depth of 3. Also, there is exemplarily provided third video data 330 with a resolution of 352×288, and a coding unit with a maximum size of 16 and a maximum depth of 1. The maximum depth shown in FIG. 3 denotes a total number of splits from a maximum coding unit to a minimum decoding unit.

If a resolution is high or a data amount is large, a maximum size of a coding unit may be large so as to increase encoding efficiency and to accurately reflect characteristics of an image. Accordingly, the maximum size of the coding unit of the first and the second video data 310 and 320 having the higher resolution than the third video data 330 may be 64.

Since the maximum depth of the first video data 310 is 2, coding units 315 of the first video data 310 may include a maximum coding unit having a long axis size of 64, and coding units having long axis sizes of 32 and 16 since depths are deepened to two layers by splitting the maximum coding unit twice. Meanwhile, since the maximum depth of the third video data 330 is 1, coding units 335 of the third video data 330 may include a maximum coding unit having a long axis size of 16, and coding units having a long axis size of 8 since depths are deepened to one layer by splitting the maximum coding unit once.

Since the maximum depth of the second video data 320 is 3, coding units 325 of the second video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
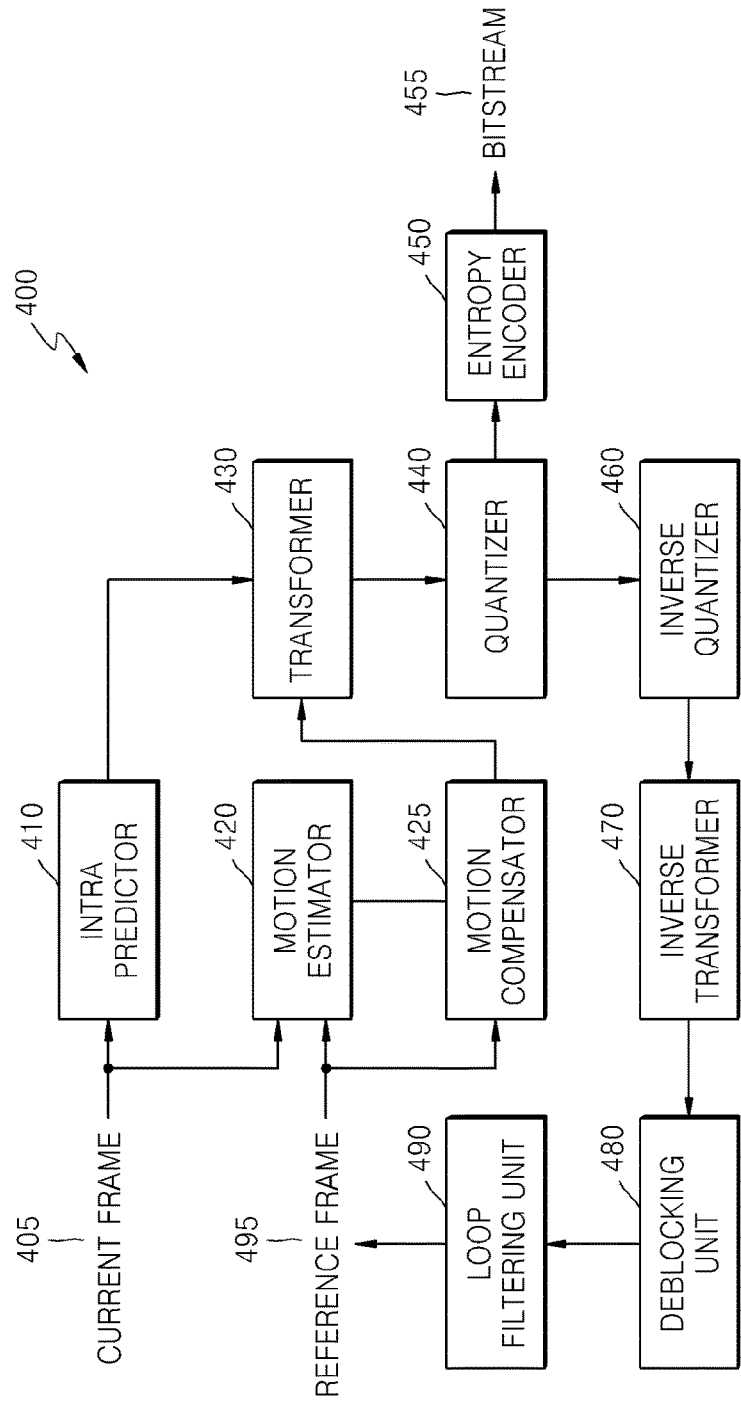
FIG. 4 is a block diagram of an image encoder based on coding units according to an exemplary embodiment.

FIG. 4 is a block diagram of an image encoder 400 based on coding units, according to an exemplary embodiment.

The image encoder 400 may perform operations of a coding unit determiner 120 of a video encoding apparatus 100 according to an exemplary embodiment to encode image data. That is, referring to FIG. 4, an intra predictor 410 performs intra prediction on coding units, from among a current frame 405, in an intra mode, and a motion estimator 420 and a motion compensator 425 perform inter estimation and motion compensation on coding units, from among the current frame, in an inter mode by using the current frame 405 and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490, perform operations based on each coding unit from among coding units having a tree structure while considering the maximum depth of each maximum coding unit.

Specifically, the intra predictor 410, the motion estimator 420, and the motion compensator 425 determine partitions and a prediction mode of each coding unit from among the coding units having a tree structure while considering a maximum size and a maximum depth of a current maximum coding unit, and the transformer 430 determines the size of the transformation unit in each coding unit from among the coding units having a tree structure.

Figure 5:
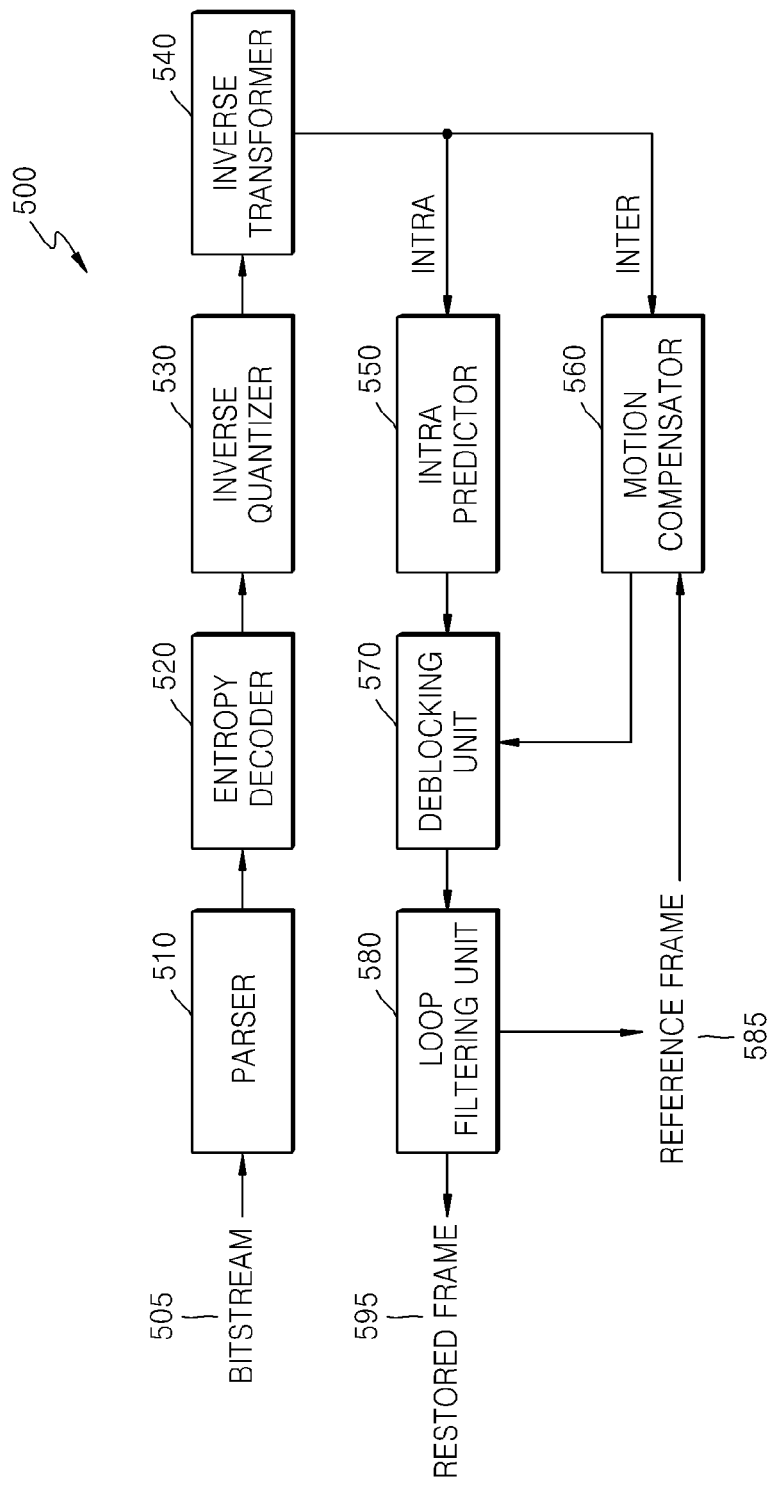
FIG. 5 is a block diagram of an image decoder based on coding units according to an exemplary embodiment.

FIG. 5 is a block diagram of an image decoder 500 based on coding units, according to an exemplary embodiment.

Referring to FIG. 5, a parser 510 parses encoded image data to be decoded and information about encoding used for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in an image data decoder 230 of a video decoding apparatus 200 according to an exemplary embodiment, the image decoder 500 may perform operations that are performed after the parser 510.

In order for the image decoder 500 to be applied in the video decoding apparatus 200, elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580, perform operations based on coding units having a tree structure for each maximum coding unit.

Specifically, the intra prediction 550 and the motion compensator 560 perform operations based on partitions and a prediction mode for each of the coding units having a tree structure, and the inverse transformer 540 performs operations based on a size of a transformation unit for each coding unit.

Figure 6:
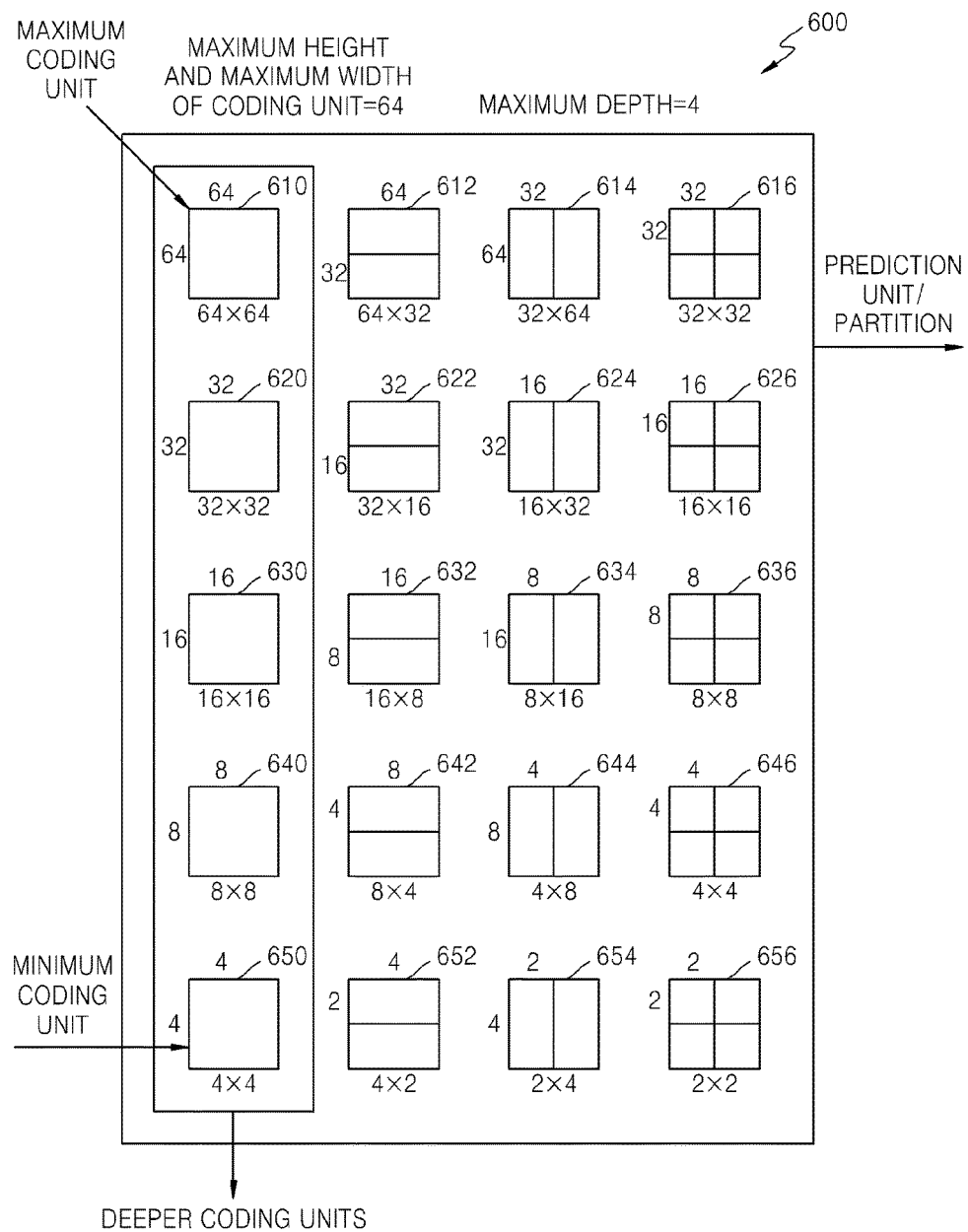
FIG. 6 is a diagram illustrating deeper coding units according to depths, and partitions according to an exemplary embodiment.

FIG. 6 is a diagram illustrating deeper coding units according to depths, and partitions, according to an exemplary embodiment.

A video encoding apparatus 100 and a video decoding apparatus 200 according to exemplary embodiments use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

Referring to FIG. 6, in a hierarchical structure 600 of coding units, according to an exemplary embodiment, the maximum height and the maximum width of the coding units are each 64, and the maximum depth is 4. Since a depth deepens along a vertical axis of the hierarchical structure 600, a height and a width of a deeper coding unit are each split. Also, a prediction unit and partitions, which are bases for prediction encoding of each deeper coding unit, are shown along a horizontal axis of the hierarchical structure 600.

That is, a first coding unit 610 is a maximum coding unit in the hierarchical structure 600, wherein a depth is 0 and a size, i.e., a height by width, is 64×64. The depth deepens along the vertical axis, and a second coding unit 620 having a size of 32×32 and a depth of 1, a third coding unit 630 having a size of 16×16 and a depth of 2, a fourth coding unit 640 having a size of 8×8 and a depth of 3, and a fifth coding unit 650 having a size of 4×4 and a depth of 4 exist. The fifth coding unit 650 having the size of 4×4 and the depth of 4 is a minimum coding unit.

The prediction unit and the partitions of a coding unit are arranged along the horizontal axis according to each depth. That is, if the first coding unit 610 having the size of 64×64 and the depth of 0 is a prediction unit, the prediction unit may be split into partitions included in the first coding unit 610, i.e., a partition 610 having a size of 64×64, partitions 612 having a size of 64×32, partitions 614 having a size of 32×64, or partitions 616 having a size of 32×32.

Similarly, a prediction unit of the second coding unit 620 having the size of 32×32 and the depth of 1 may be split into partitions included in the second coding unit 620, i.e., a partition 620 having a size of 32×32, partitions 622 having a size of 32×16, partitions 624 having a size of 16×32, and partitions 626 having a size of 16×16.

Similarly, a prediction unit of the third coding unit 630 having the size of 16×16 and the depth of 2 may be split into partitions included in the third coding unit 630, i.e., a partition having a size of 16×16 included in the third coding unit 630, partitions 632 having a size of 16×8, partitions 634 having a size of 8×16, and partitions 636 having a size of 8×8.

Similarly, a prediction unit of the fourth coding unit 640 having the size of 8×8 and the depth of 3 may be split into partitions included in the fourth coding unit 640, i.e., a partition having a size of 8×8 included in the fourth coding unit 640, partitions 642 having a size of 8×4, partitions 644 having a size of 4×8, and partitions 646 having a size of 4×4.

The fifth coding unit 650 having the size of 4×4 and the depth of 4 is the minimum coding unit and a coding unit of the lowermost depth. A prediction unit of the fifth coding unit 650 is only assigned to a partition having a size of 4×4.

In order to determine the at least one coded depth of the coding units of the maximum coding unit 610, a coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are used to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the first coding unit 610 may be selected as the coded depth and a partition type of the first coding unit 610.

Figure 7:
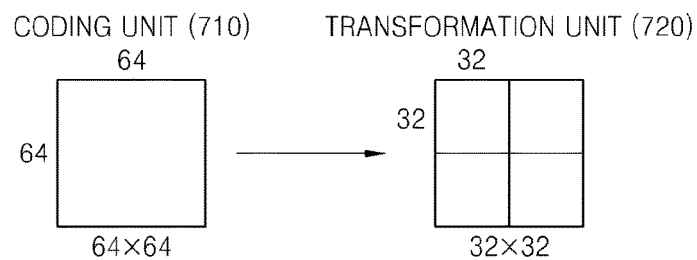
FIG. 7 is a diagram for describing a relationship between a coding unit and transformation units, according to an exemplary embodiment.

FIG. 7 is a diagram for describing a relationship between a coding unit 710 and transformation units 720, according to an exemplary embodiment.

A video encoding or decoding apparatus 100 or 200 according to exemplary embodiments encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding or decoding apparatus 100 or 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, such that a transformation unit having the least coding error may be selected.

Figure 8:
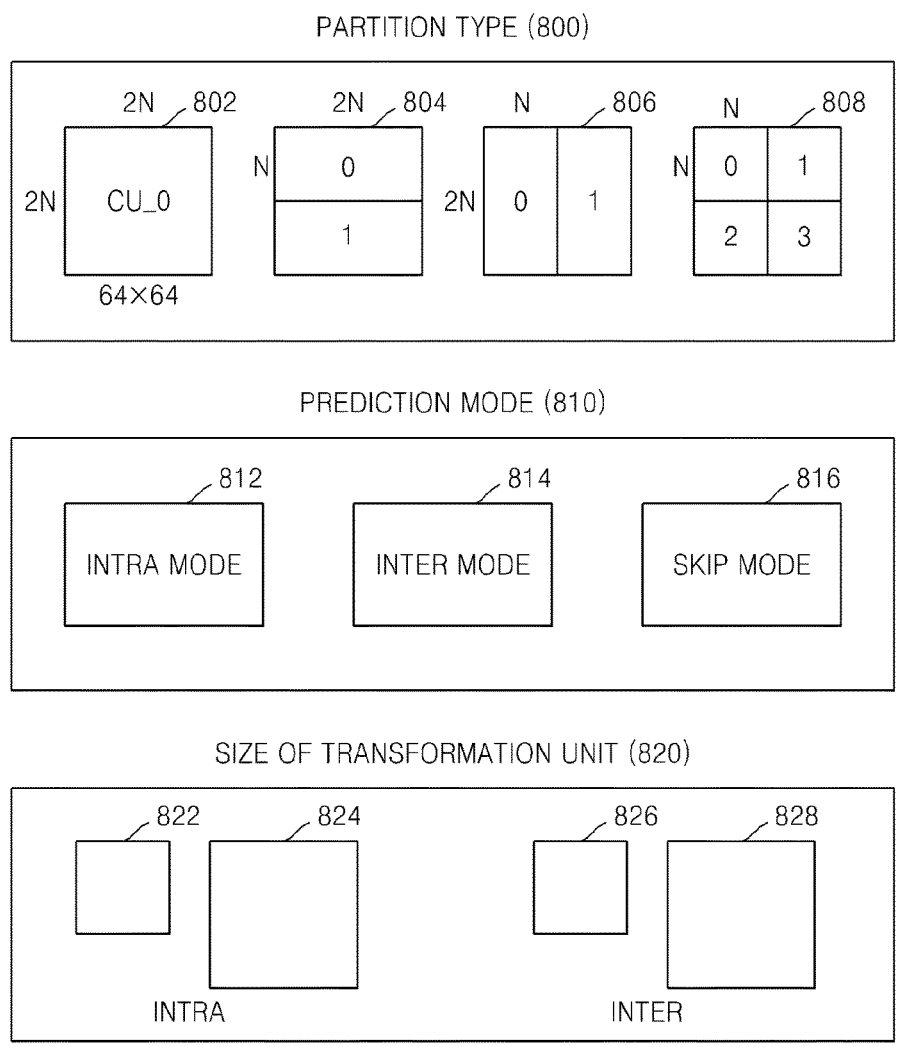
FIG. 8 is a diagram for describing encoding information of coding units corresponding to a coded depth, according to an exemplary embodiment.

FIG. 8 is a diagram for describing encoding information of coding units corresponding to a coded depth, according to an exemplary embodiment.

Referring to FIG. 8, an output unit 130 of a video encoding apparatus 100 according to an exemplary embodiment may encode and transmit information 800 about a partition type, information 810 about a prediction mode, and information 820 about a size of a transformation unit for each coding unit corresponding to a coded depth, as information about an encoding mode.

The information 800 about the partition type is information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about the partition type is set to indicate one of the partition 804 having a size of 2N×N, the partition 806 having a size of N×2N, and the partition 808 having a size of N×N The information 810 about the prediction mode indicates a prediction mode of each partition. For example, the information 810 about the prediction mode may indicate a mode of prediction encoding performed on a partition indicated by the information 800 about the partition type, i.e., an intra mode 812, an inter mode 814, or a skip mode 816.

The information 820 about the size of a transformation unit indicates a transformation unit to be based on when transformation is performed on a current coding unit. For example, the transformation unit may be a first intra transformation unit 822, a second intra transformation unit 824, a first inter transformation unit 826, or a second intra transformation unit 828.

Figure 9:
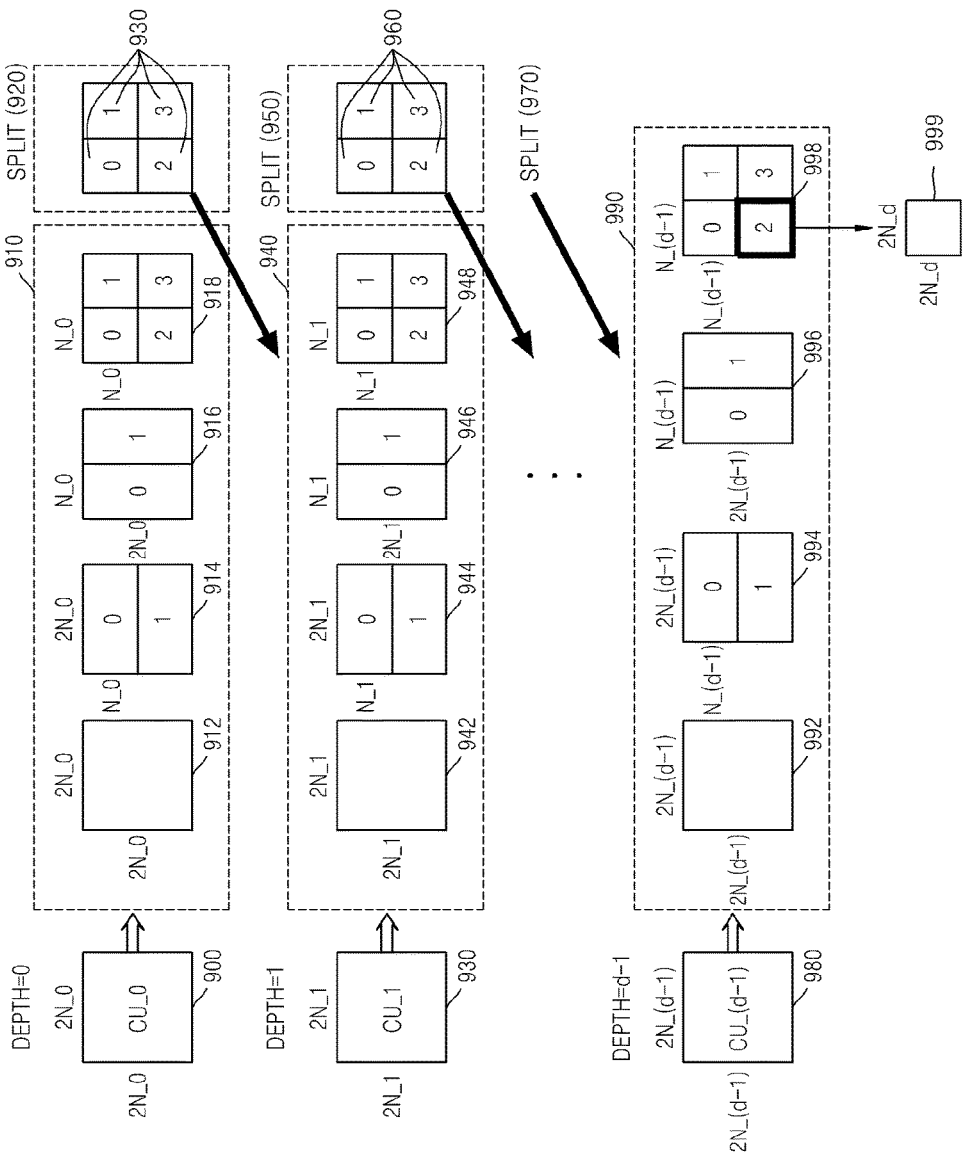
FIG. 9 is a diagram of deeper coding units according to depths, according to an exemplary embodiment.

An image data and encoding information extractor 220 of a video decoding apparatus 200 according to an exemplary embodiment may extract and use the information 800, 810, and 820 for decoding, according to each deeper coding unit FIG. 9 is a diagram of deeper coding units according to depths, according to an exemplary embodiment.

Split information may be used to indicate a change of a depth. The split information indicates whether a coding unit of a current depth is split into coding units of a lower depth.

Referring to FIG. 9, a prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. Although FIG. 9 only illustrates the partition types 912 through 918 which are obtained by symmetrically splitting the prediction unit 910, it is understood that a partition type is not limited thereto. For example, according to another exemplary embodiment, the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0× 2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

For example, if the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1× 2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

As an example, if an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operations according to each depth may be performed up to when a depth becomes d−1, and split information may be encoded as up to when a depth is one of 0 to d−2. For example, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth. In this case, a coded depth for the coding units of a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a minimum unit for the current maximum coding unit. A minimum unit according to an exemplary embodiment may be a rectangular data unit obtained by splitting a minimum coding unit 980 by 4. By performing the encoding repeatedly, a video encoding apparatus 100 according to an exemplary embodiment may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, split information of the coded depth is set to 0, and split information of depths excluding the coded depth is set to 1.

An image data and encoding information extractor 220 of a video decoding apparatus 200 according to an exemplary embodiment may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 10:
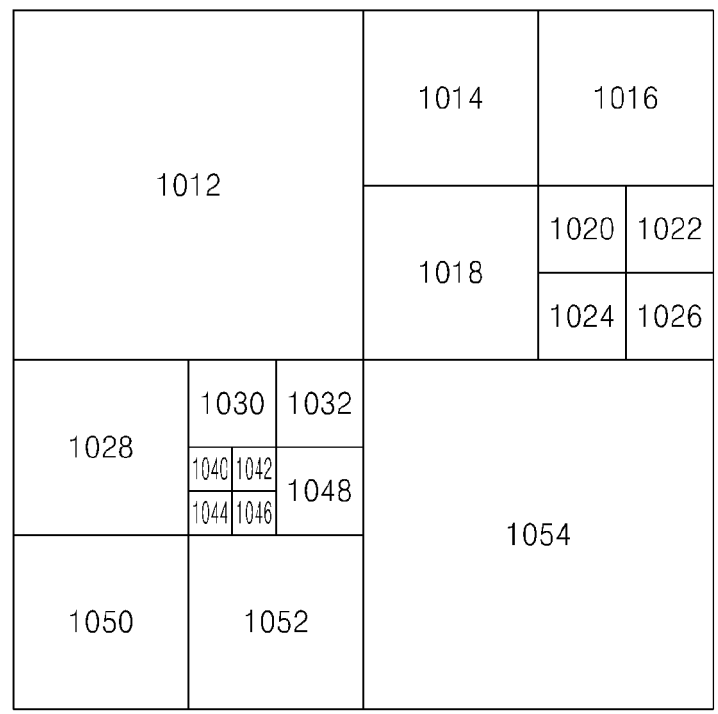
FIGS. 10 through 12 are diagrams for describing a relationship between coding units, prediction units, and transformation units, according to one or more exemplary embodiments.
Figure 11:
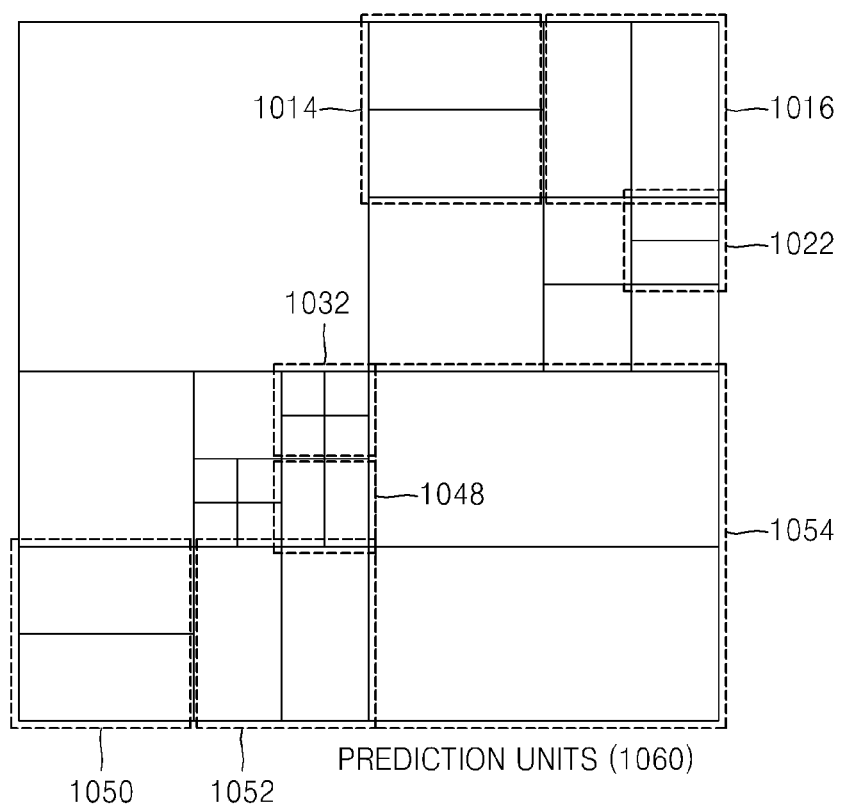
Figure 12:
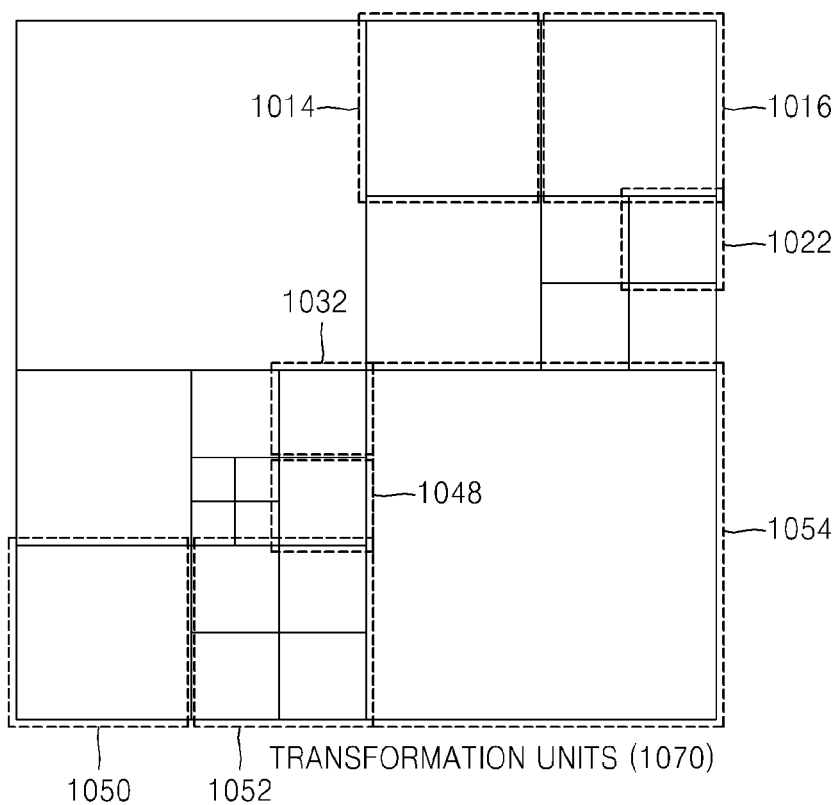

FIGS. 10 through 12 are diagrams for describing a relationship between coding units 1010, prediction units 1060, and transformation units 1070, according to one or more exemplary embodiments.

Referring to FIG. 10, the coding units 1010 are coding units having a tree structure, corresponding to coded depths determined by a video encoding apparatus 100 according to an exemplary embodiment, in a maximum coding unit. Referring to FIGS. 11 and 12, the prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting coding units of the encoding units 1010. In particular, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 of the transformation units 1070 are different from those of the prediction units 1060 in terms of sizes and shapes. That is, the video encoding and decoding apparatuses 100 and 200 according to exemplary embodiments may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Exemplary Table 1 shows the encoding information that may be set by the video encoding and decoding apparatuses 100 and 200.

TABLE 1

| Split Information 0 (Encoding on Coding Unit having Size of 2N × 2N and Current Depth of d) | | | | Split Information 1 |
|---|---|---|---|---|
| Prediction Mode | Partition Type | | Size of Transformation Unit | | Repeatedly Encode Coding Units having |
| Intra Inter | Symmetrical Partition | Asymmetrical Partition | Split Information 0 of | Split Information 1 of | |

TABLE 1-continued

| | Split Information 0 (Encoding on Coding Unit having Size of 2N × 2N and Current Depth of d) | | | | Split Information 1 |
|---|---|---|---|---|---|
| Skip (Only 2N × 2N) | Type | Type | Transformation Unit | Transformation Unit | Lower Depth of d + 1 |
| | 2N × 2N | 2N × nU | 2N × 2N | N × N | |
| | 2N × N | 2N × nD | | (Symmetrical Type) | |
| | N × 2N | nL × 2N | | N/2 × N/2 | |
| | N × N | nR × 2N | | (Asymmetrical Type) | |

An output unit 130 of the video encoding apparatus 100 may output the encoding information about the coding units having a tree structure, and an image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth in which a current coding unit is no longer split into a lower depth, is a coded depth. Information about a partition type, prediction mode, and a size of a transformation unit may be defined for the coded depth. If the current coding unit is further split according to the split information, encoding is independently performed on split coding units of a lower depth.

A prediction mode may be one of an intra mode, an inter mode, and a skip mode. The intra mode and the inter mode may be defined in all partition types, and the skip mode may be defined in only a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or the width of the prediction unit. The asymmetrical partition types having the sizes of 2N×nU and 2N×nD may be respectively obtained by splitting the height of the prediction unit in ratios of 1:3 and 3:1, and the asymmetrical partition types having the sizes of nL×2N and nR×2N may be respectively obtained by splitting the width of the prediction unit in ratios of 1:3 and 3:1

The size of the transformation unit may be set to be two types in the intra mode and two types in the inter mode. For example, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a coding unit corresponding to a prediction unit, and a coding unit corresponding to a minimum unit. The coding unit corresponding to the coded depth may include at least one of a prediction unit and a minimum unit including the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

However, it is understood that another exemplary embodiment is not limited thereto. For example, according to another exemplary embodiment, if a current coding unit is predicted based on encoding information of adjacent data units, data units adjacent to the current coding unit are searched using encoding information of the data units, and the searched adjacent coding units may be referred for predicting the current coding unit.

Figure 13:
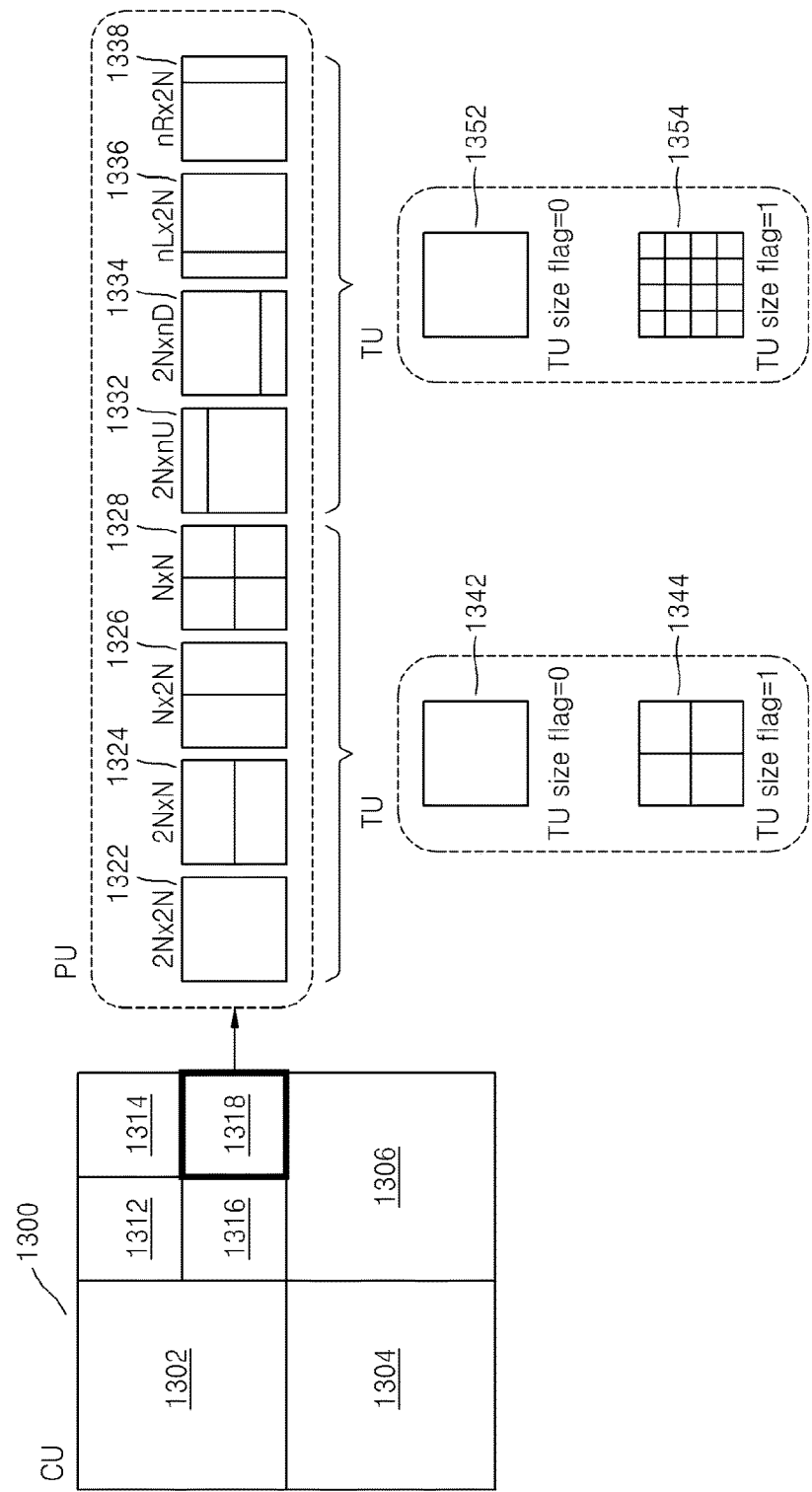
FIG. 13 is a diagram for describing a relationship between a coding unit, a prediction unit or a partition, and a transformation unit, according to encoding mode information of exemplary Table 1 below, according to an exemplary embodiment.

FIG. 13 is a diagram for describing a relationship between a coding unit, a prediction unit or a partition, and a transformation unit, according to encoding mode information of exemplary Table 1, according to an exemplary embodiment.

Referring to FIG. 13, a maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e., the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 13, the TU size flag is a flag having a value of 0 or 1, although it is understood that the TU size flag is not limited to 1 bit, and a transformation unit may be hierarchically split having a tree structure while the TU size flag increases from 0.

In this case, the size of a transformation unit that has been actually used may be expressed by using a TU size flag of a transformation unit, according to an exemplary embodiment, together with a maximum size and minimum size of the transformation unit. According to an exemplary embodiment, a video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. According to an exemplary embodiment, a video decoding apparatus 200 may decode video by using the maximum transformation unit size information, the minimum transformation unit size information, and the maximum TU size flag.

For example, if the size of a current coding unit is 64×64 and a maximum transformation unit size is 32×32, the size of a transformation unit may be 32×32 when a TU size flag is 0, may be 16×16 when the TU size flag is 1, and may be 8×8 when the TU size flag is 2.

As another example, if the size of the current coding unit is 32×32 and a minimum transformation unit size is 32×32, the size of the transformation unit may be 32×32 when the TU size flag is 0. Here, the TU size flag cannot be set to a value other than 0, since the size of the transformation unit cannot be less than 32×32.

As another example, if the size of the current coding unit is 64×64 and a maximum TU size flag is 1, the TU size flag may be 0 or 1. Here, the TU size flag cannot be set to a value other than 0 or 1.

Thus, if it is defined that the maximum TU size flag is MaxTransformSizeIndex, a minimum transformation unit size is MinTransformSize, and a transformation unit size is RootTuSize when the TU size flag is 0, a current minimum transformation unit size CurrMinTuSize that can be determined in a current coding unit, may be defined by Equation (1):

$$\text{CurrMinTuSize}=\max(\text{MinTransformSize},\text{RootTuSize}/(2^{\wedge}\text{MaxTransformSizeIndex})) \quad (1).$$

Compared to the current minimum transformation unit size CurrMinTuSize that can be determined in the current coding unit, a transformation unit size RootTuSize when the TU size flag is 0 may denote a maximum transformation unit size that can be selected in the system. In Equation (1), RootTuSize/(2^MaxTransformSizeIndex) denotes a transformation unit size when the transformation unit size RootTuSize, when the TU size flag is 0, is split a number of times corresponding to the maximum TU size flag. Furthermore, MinTransformSize denotes a minimum transformation size. Thus, a smaller value from among RootTuSize/(2^MaxTransformSizeIndex) and MinTransformSize may be the current minimum transformation unit size CurrMinTuSize that can be determined in the current coding unit.

According to an exemplary embodiment, the maximum transformation unit size RootTuSize may vary according to the type of a prediction mode.

For example, if a current prediction mode is an inter mode, then RootTuSize may be determined by using Equation (2) below. In Equation (2), MaxTransformSize denotes a maximum transformation unit size, and PUSize denotes a current prediction unit size.

$$\text{RootTuSize}=\min(\text{MaxTransformSize},\text{PUSize}) \quad (2).$$

That is, if the current prediction mode is the inter mode, the transformation unit size RootTuSize when the TU size flag is 0, may be a smaller value from among the maximum transformation unit size and the current prediction unit size.

If a prediction mode of a current partition unit is an intra mode, RootTuSize may be determined by using Equation (3) below. In Equation (3), PartitionSize denotes the size of the current partition unit.

$$\text{RootTuSize}=\min(\text{MaxTransformSize},\text{PartitionSize}) \quad (3).$$

That is, if the current prediction mode is the intra mode, the transformation unit size RootTuSize when the TU size flag is 0 may be a smaller value from among the maximum transformation unit size and the size of the current partition unit.

However, the current maximum transformation unit size RootTuSize that varies according to the type of a prediction mode in a partition unit is merely exemplary, and another exemplary embodiment is not limited thereto.

Hereinafter, encoding and decoding of residual block performed by the entropy encoder 450 of the video encoding apparatus 400 illustrated in FIG. 4 and the entropy decoder 520 of the video decoding apparatus 500 illustrated in FIG. 5 will be described in detail. In the following description, an encoding unit denotes a current encoded block in an encoding process of an image, and a decoding unit denotes a current decoded block in a decoding process of an image. The encoding unit and the decoding unit are different in that the encoding unit is used in the encoding process and the decoding unit is used in the decoding. For the sake of consistency, except for a particular case, the encoding unit and the decoding unit are referred to as a coding unit in both the encoding and decoding processes. Also, one of ordinary skill in the art would understand by the present disclosure that an intra prediction method and apparatus according to an exemplary embodiment may also be applied to perform intra prediction in a general video codec.

Figure 14:
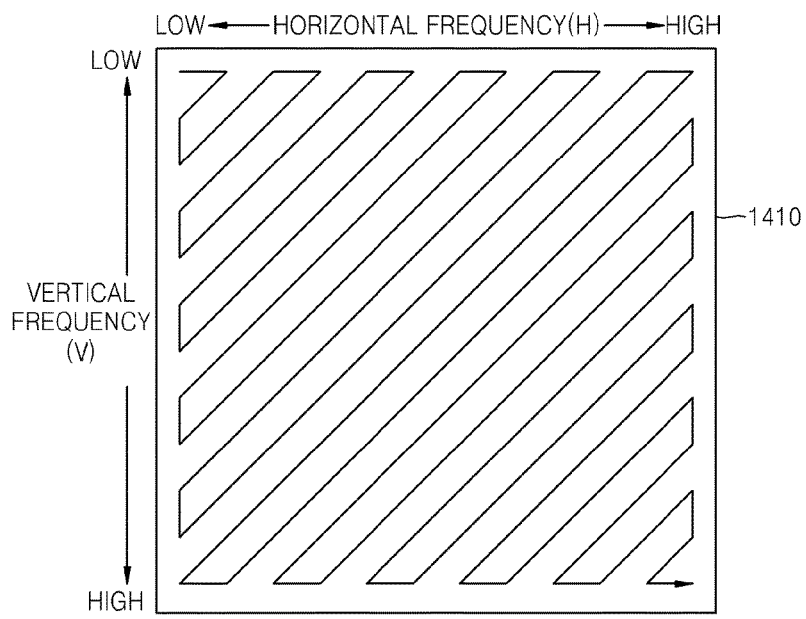
FIGS. 14A through 14C are reference diagrams for describing a process of encoding a transformation residual block in a related technical field.

FIGS. 14A through 14C are reference diagrams for describing a process of encoding a transformation residual block in a related technical field.

Referring to FIG. 14A, when a transformation residual block 1410 is generated by transforming a residual block, a significance map, which indicates a location of a nonzero effective transformation coefficient in the transformation residual block 1410 while scanning transformation coefficients in the transformation residual block 1410 according to a zigzag scanning order. After scanning the transformation coefficients in the transformation residual block 1410, level information of an effective transformation coefficient are encoded. For example, a process of encoding a transformation residual block 1420 having a size of 4×4, as illustrated in FIG. 14B, will now be described. In FIG. 14B, it is assumed that transformation coefficients at locations indicated by X are nonzero effective transformation coefficients. Here, a significance map indicates an effective transformation coefficient as 1 and a 0 transformation coefficient as 0 from among transformation coefficients in a residual block 1430, as shown in FIG. 14C. The significance map is scanned according to a predetermined scanning order, while context adaptive binary arithmetic coding is performed thereon. For example, when the significance map of FIG. 14C is encoded according to a raster scanning order, and scanning is performed from left to right and top to bottom, context adaptive binary arithmetic coding is performed on the significance map corresponding to an binary string of "111111110101000." Level information of an effective coefficient, i.e., a sign and an absolute value of the effective coefficient, is encoded after the significance map is encoded.

Such a process in the related technical field may be utilized for encoding a transformation residual block having a small size, such as 4×4 or 8×8, but may not be suitable for encoding a transformation residual block having a large size, such as 16×16, 32×32, or 64×64. In particular, if all transformation coefficients in a transformation residual block are scanned and encoded according to the process of FIGS. 14A through 14C with respect to a transformation residual block having a large size, a length of a binary string corresponding to a significance map may increase and encoding efficiency may deteriorate.

Accordingly, a method and apparatus for encoding a residual block according to exemplary embodiments are capable of efficiently encoding a transformation residual block by splitting the transformation residual block into predetermined frequency band units and encoding an effective coefficient flag according to the frequency band units, which indicates whether a nonzero effective transformation coefficient exists for each frequency band unit, while encoding effective transformation coefficient information, i.e., a significance map and level information of an effective coefficient, in a frequency band in which an effective coefficient flag according to frequency band units has a value of 1.

Figure 15:
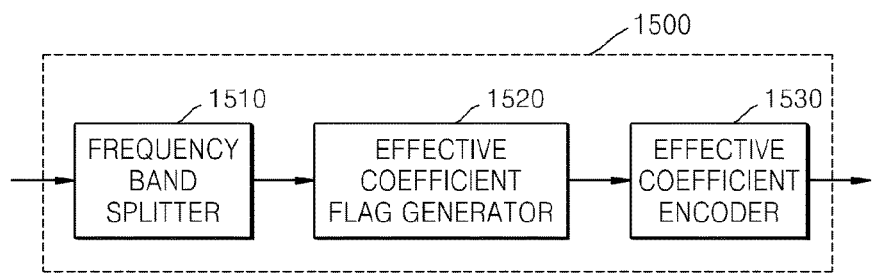
FIG. 15 is a block diagram of an apparatus for encoding a residual block, according to an exemplary embodiment.

FIG. 15 is a block diagram of an apparatus 1500 for encoding a residual block, according to an exemplary embodiment. While not restricted thereto, the apparatus 1500 may correspond to the entropy encoder 450 of FIG. 4, or may be included in the entropy encoder 450.

Referring to FIG. 15, the apparatus 1500 includes a frequency band splitter 1510, an effective coefficient flag generator 1520, and an effective coefficient encoder 1530.

The frequency band splitter 1510 splits a transformation residual block into predetermined frequency band units. Referring back to FIG. 14A, in the exemplary transformation residual block 1410, an upper left transformation coefficient has a low frequency component, and a lower right transformation coefficient has a high frequency component. Most of the effective transformation coefficients of the transformation residual block 1410 may exist in low frequency bands, and the transformation coefficients having high frequency components may mostly have a value of 0. In this case, a nonzero effective transformation coefficient from among the transformation coefficients of the high frequency component is sparse. Specifically, distribution of effective transformation coefficients of high frequency components may be sparser when a transformation residual block is generated by performing transformation with a transformation unit having a size of 16×16, 32×32, 64×64, or above, which is larger than a related art transformation unit having a size of 4×4 or 8×8, as in the image encoder 400. Accordingly, the frequency band splitter 1510 may split the transformation residual block into the frequency band units while considering distribution characteristics according to the frequency bands of the transformation coefficients in the transformation residual block.

FIGS. 16A through 16J are diagrams for describing splitting of a transformation residual block into predetermined frequency band units, according to one or more exemplary embodiments.

Figure 16A:
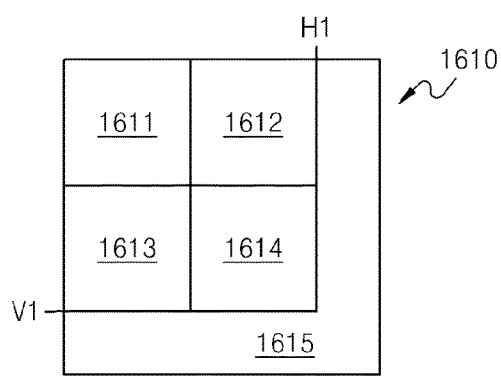

Referring to FIG. 16A, the frequency band splitter 1510 generates frequency band units 1611 through 1614 by splitting a transformation residual block 1610 at predetermined frequency intervals from a low frequency band to a horizontal frequency H1 and a vertical frequency V1. In FIG. 16A, horizontal sides and vertical sides of the frequency band units 1611 through 1614 have the same length, although it is understood that the lengths of the horizontal and vertical sides may differ from each other. If a length of a remaining frequency band from the horizontal frequency H1 to a maximum horizontal frequency is less than a frequency interval corresponding to a length of the horizontal side of each of the frequency band units 1611 through 1614, or if a length of a remaining frequency band from the vertical frequency V1 to a maximum vertical frequency is less than a frequency interval corresponding to a length of the vertical side of each of the frequency band units 1611 through 1614, the frequency band splitter 1510 no longer splits the transformation residual block 1610, and generates a frequency band unit 1615 corresponding to a high frequency component. Effective transformation coefficients may be intensively distributed in the frequency band units 1611 through 1614 corresponding to low frequency components, and distribution of effective transformation coefficients of high frequency components may be sparse. Accordingly, even when the entire remaining high frequency components, aside from the frequency band units 1611 through 1614 generated by splitting the transformation residual block 1610 at predetermined frequency intervals, are generated in one frequency band unit 1615, an overhead while encoding transformation coefficients in the frequency band unit 1615 may not remarkably increase.

Figure 16B:
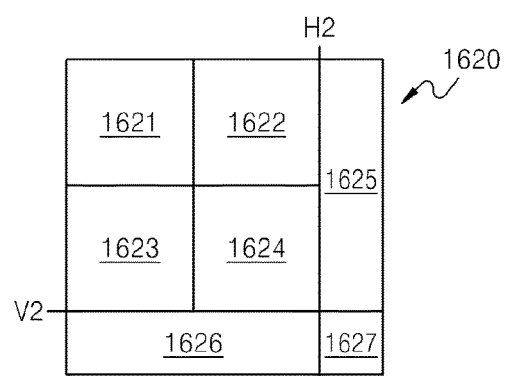

In another exemplary embodiment, as shown in FIG. 16B, the frequency band splitter 1510 may generate frequency band units 1621 through 1624 by splitting a transformation residual block 1620 from a low frequency band to a horizontal frequency H2 and a vertical frequency V2, and generate frequency band units 1625 through 1627 by splitting remaining high frequency components of the transformation residual block 1620 based on the horizontal frequency H2 and the vertical frequency V2, similarly to the description with reference to FIG. 16A.

Figure 16C:
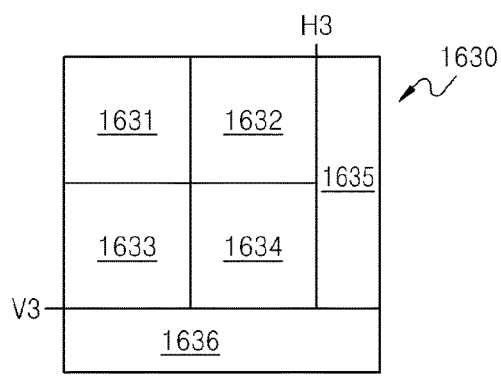

Moreover, according to another exemplary embodiment, as shown in FIG. 16C, the frequency band splitter 1510 may generate frequency band units 1631 through 1634 by splitting a transformation residual block 1630 from a low frequency band to a horizontal frequency H3 and a vertical frequency V3, and generate frequency band units 1635 and 1636 of high frequency components by splitting remaining high frequency components of the transformation residual block 1630 into two based on the vertical frequency V3, similarly to the description with reference to FIG. 16A.

Figure 16D:
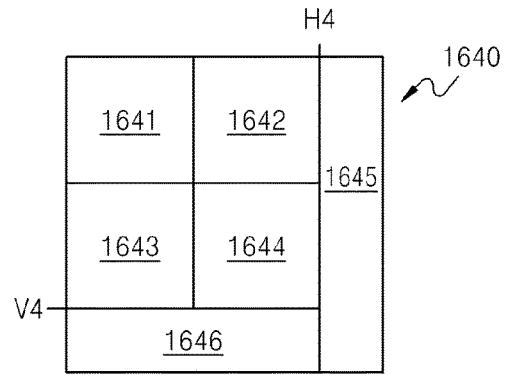

Referring to FIG. 16D, according to another exemplary embodiment, the frequency band splitter 1510 may generate frequency band units 1641 through 1644 by splitting a transformation residual block 1640 from a low frequency band to a horizontal frequency H4 and a vertical frequency V4, and generate frequency band units 1645 and 1646 of high frequency components by splitting remaining high frequency components of the transformation residual block 1630 into two based on the horizontal frequency H4, similarly to the description with reference to FIG. 16A.

As described above, distribution of effective transformation coefficients is concentrated in a low frequency band, and is sparse toward a high frequency band. Accordingly, as shown in FIG. 16E, the frequency band splitter 1510 splits a transformation residual block 1650 in such a way that a unit size split in the low frequency band is smaller than a unit size split in the high frequency band, by considering a distribution characteristic of the effective transformation coefficients. In other words, the frequency band splitter 1510 splits the transformation residual block 1650 minutely in the low frequency band and relatively large in the high frequency band so that the effective transformation coefficients that are concentrated in the low frequency band are precisely encoded. For example, as shown in FIG. 16E, the frequency band splitter 1510 may generate frequency band split units 1651 through 1657 by splitting the transformation residual block 1650 based on a horizontal frequency H5, vertical frequency V5, a horizontal frequency H6 having a larger value than a multiple of the horizontal frequency H5, and a vertical frequency V6 having a larger value than a multiple of the vertical frequency V5. Thus, when A1651 through A1657 respectively denote sizes of the frequency band split units 1651 through 1657, the transformation residual block 1650 is split in such a way that A1651 has a minimum size and A1657 has a maximum size.

Referring to FIG. 16F, according to another exemplary embodiment, the frequency band splitter 1510 may split a transformation residual block 1660 into frequency band units 1661 having the same size.

Figure 16G:
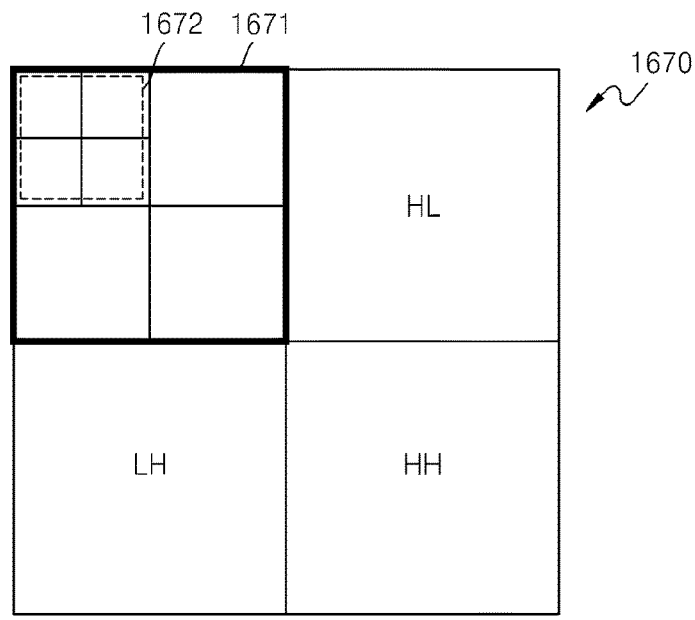

Moreover, referring to FIG. 16G, according to another exemplary embodiment, the frequency band splitter 1510 may quadrisect a transformation residual block 1670, and again quadrisect a smallest low frequency band unit 1671 from among quadrisected frequency band units to generate frequency band units. The frequency band splitter 1510 may again quadrisect a smallest low frequency band unit 1672 from among frequency band units obtained by quadrisecting the smallest low frequency band unit 1671. Such a splitting process may be repeated until sizes of quadrisected frequency band units are equal to or below a predetermined size.

Figure 16H:
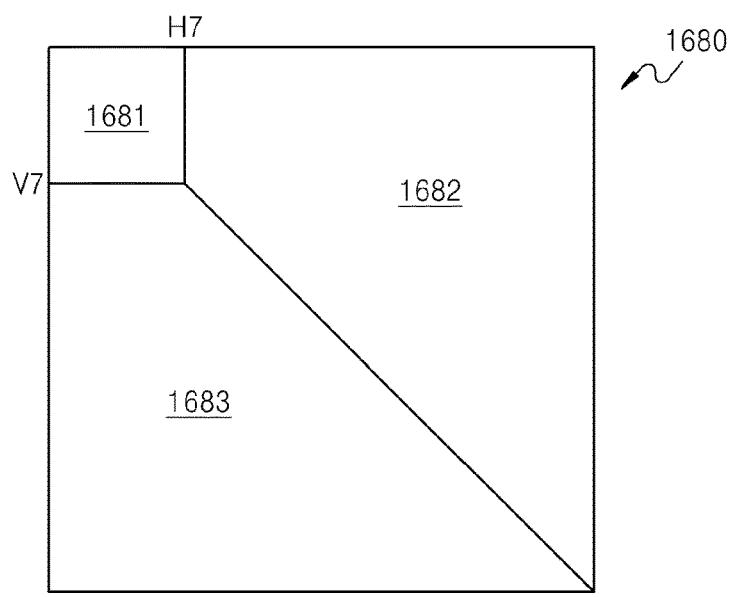

According to another exemplary embodiment, referring to FIG. 16H, the frequency band splitter 1510 may generate a frequency band unit 1681 of a low frequency component from a low frequency to a horizontal frequency H7 and a vertical frequency V7, and generate frequency band units 1682 and 1683 by diagonally splitting remaining high frequency components of a transformation residual block 1680.

Figure 16I:
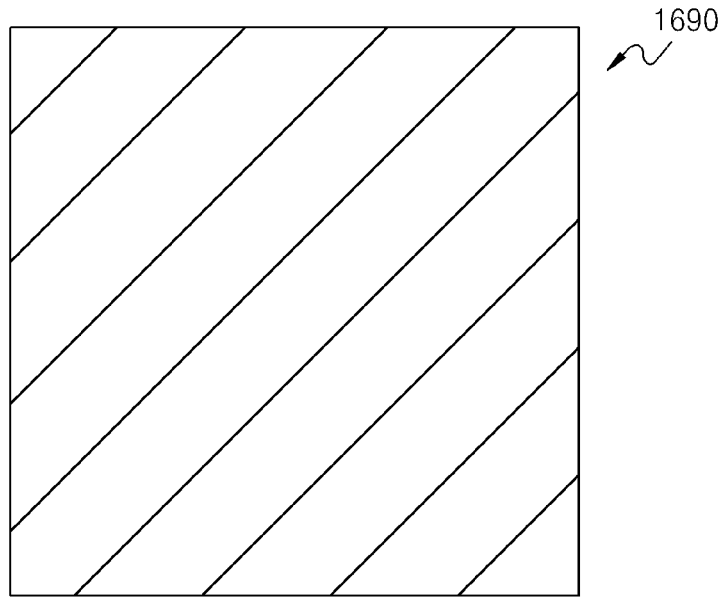
Figure 16J:
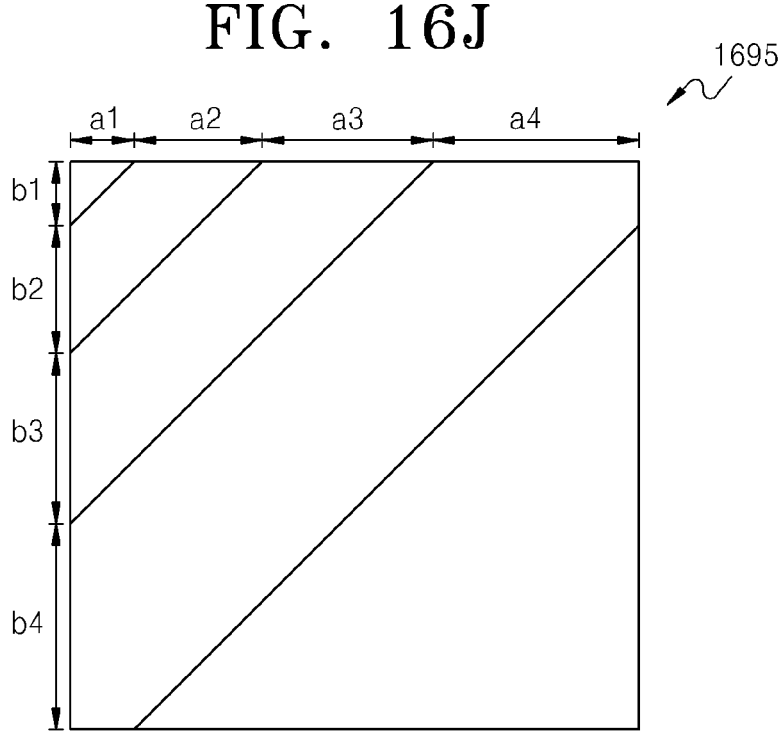

Referring to FIGS. 16I and 16J, according to one or more other exemplary embodiments, the frequency band splitter 1510 may split transformation residual blocks 1690 and 1695 by connecting a horizontal frequency and a vertical frequency, which have predetermined values. In FIG. 16I, the transformation residual block 1690 is split by connecting the horizontal frequency and the vertical frequency at uniform frequency intervals. In FIG. 16J, the transformation residual block 1695 is split so that frequency intervals increase toward a high frequency, i.e., by connecting a1 and b1, a2 and b2, a3 and b3, and a4 and b4, wherein a1<a2<a3<a4 and b1<b2<b3<b4.

According to another exemplary embodiment, instead of using a predetermined split form as shown in FIGS. 16A through 16J, the frequency band splitter 1510 may determine image characteristics of a transformation residual block by using distribution characteristics of effective transformation coefficients of the transformation residual block or a number of the effective transformation coefficients in each frequency band, and determine a size of a frequency unit to split the transformation residual block according to each frequency band by using the determined image characteristics. For example, when effective transformation coefficients in a transformation residual block exist only in a frequency band smaller than a horizontal frequency H8 and a vertical frequency V8 and do not exist in a frequency band larger than the horizontal frequency H8 and the vertical frequency V8, the frequency band splitter 1510 may set the entire transformation residual block from a low frequency band to the horizontal frequency H8 and the vertical frequency V8 as one frequency band unit. Alternatively, the frequency band splitter 1510 split the transformation residual block into frequency band units having the same size, and set a remaining frequency band larger than the horizontal frequency H8 and the vertical frequency V8 as one frequency band unit.

It is understand that the splitting of a transformation residual block into predetermined frequency band units is not limited to the exemplary embodiments described above with reference to FIGS. 16A through 16J, and that a transformation residual block may be split into various forms in one or more other exemplary embodiments.

Meanwhile, split forms of a transformation residual block by the frequency band splitter 1510 may be identically set in an encoder and a decoder. However, it is understood that another exemplary embodiment is not limited thereto. For example, according to another exemplary embodiment, a predetermined split index may be determined for each of various split form, such as shown in FIGS. 16A through 16J, and the encoder may insert the split index about split information used while encoding a transformation residual block into an encoded bitstream. For example, when integer values from split index (div_index) 0 to 9 respectively denote split forms of FIGS. 16A through 16J, and a split form used to encode a current transformation residual block is div_index=5 corresponding to the form shown in FIG. 16F, such split information may be added to encoding information of the current transformation residual block.

Referring back to FIG. 15, after the frequency band splitter 1510 splits the transformation residual block into the frequency band units, the effective coefficient flag generator 1520 generates an effective coefficient flag indicating whether an effective transformation coefficient exists in each frequency band unit. Here, the effective coefficient flag generator 1520 may not generate a separate effective coefficient flag for a smallest low frequency band unit. For example, when the transformation residual block 1610 of FIG. 16A is split, the effective coefficient flag generator 1520 may generate effective coefficient flags indicating whether effective transformation coefficients exist for the frequency band units 1612 through 1615, other than the frequency band unit 1611 of a smallest low frequency band unit. When Coeff_exist_1612, Coeff_exist_1613, Coeff_exist_1614, and Coeff_exist_1615 respectively denote the effective coefficient flags of the frequency band units 1612 through 1615, and effective coefficients exist only in the frequency band units 1612 and 1613 from among the frequency band units 1612 through 1615, the effective coefficient flag generator 1520 generates the effective coefficient flags of each frequency band unit, for example, generates Coeff_exist_1612=1, Coeff_exist_1613=1, and Coeff_exist_1614=0, Coeff_exist_1615=0. As described above, since an effective transformation coefficient may exist in the frequency band unit 1611 of the smallest low frequency band unit, an effective coefficient flag indicating existence of the effective transformation coefficient may not be separately generated for the frequency band unit 1611. Moreover, instead of separately generating the effective coefficient flag for the frequency band unit 1611, a related art coded_block_flag field indicating whether an effective transformation coefficient exists in a residual block may be used to indicate the existence of the effective transformation coefficient in the frequency band unit 1611. Such a process of generating the effective coefficient flag is not limited to the slit form of FIG. 16A, and may be applied to other split forms in one or more other exemplary embodiments, such as those of FIGS. 16B through 16J.

Meanwhile, transformation process or inverse-transformation process may be performed individually in each frequency band unit by use of different transformation or inverse-transformation method. Further, transformation process or inverse-transformation may be performed only in the frequency band unit having an effective coefficient flag 1, and may be skipped in the frequency band unit having an effective coefficient flag 0.

Referring back to FIG. 15, the effective coefficient encoder 1530 encodes a significance map and level information of the effective transformation coefficient. The significance map indicates locations of the effective transformation coefficients existing in the frequency band unit, in which a value of the effective coefficient flag generated by the effective coefficient flag generator 1520 is 1, i.e., the frequency band unit having the effective transformation coefficient.

Figure 17A:
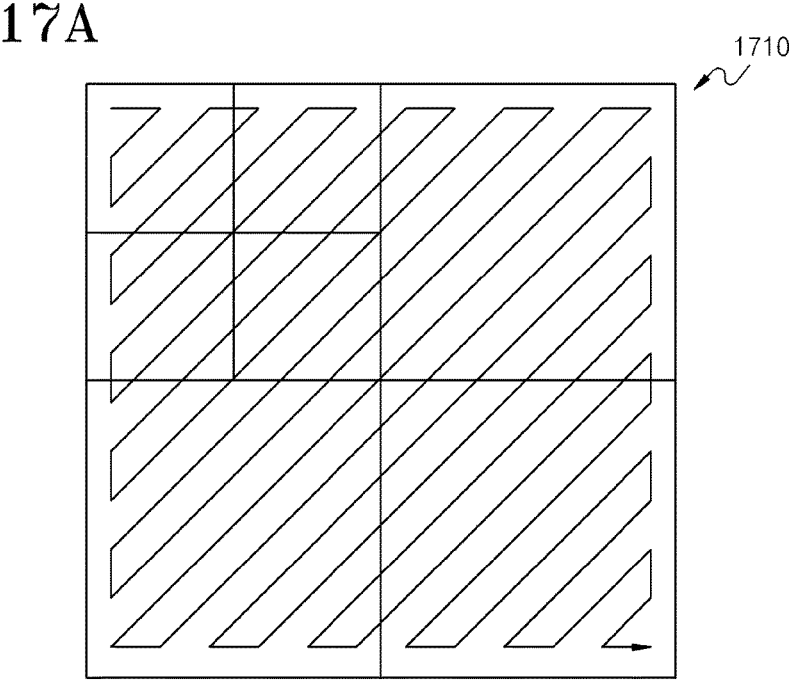
FIGS. 17A and 17B are reference diagrams for describing a process of encoding an effective transformation coefficient, according to one or more exemplary embodiments.
Figure 17B:
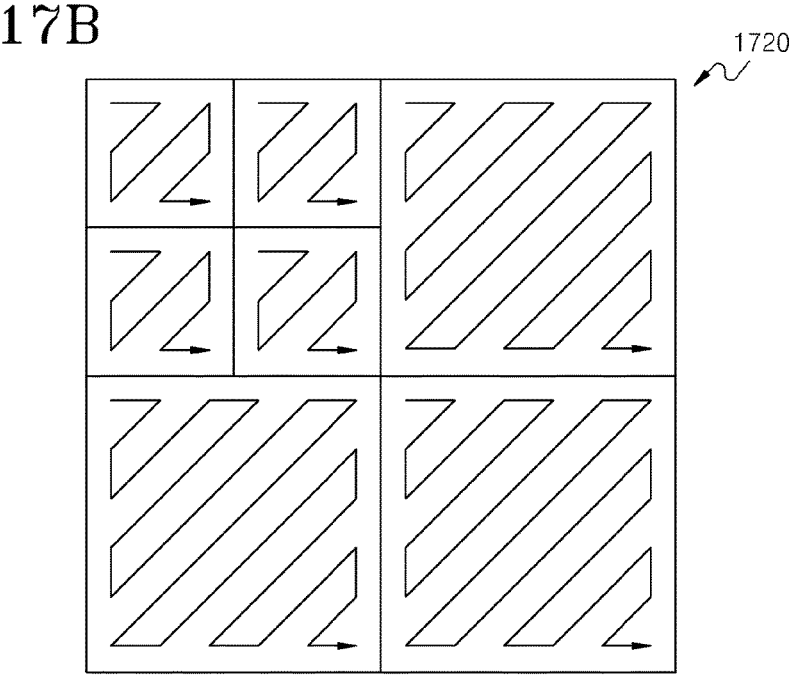

FIGS. 17A and 17B are reference diagrams for describing a process of encoding an effective transformation coefficient, according to one or more exemplary embodiments. FIGS. 17A and 17B illustrate split forms corresponding to the split form of FIG. 16E, wherein frequency band units are generated by quadrisecting a transformation residual block, and again quadrisecting a low frequency band. It is understood that the process described with reference to FIGS. 17A and 17B may also be applied to the frequency band units having other split forms, such as any one of the split forms of FIGS. 16A through 16J.

The effective coefficient encoder 1530 may encode an effective transformation coefficient by scanning an entire transformation residual block, or encode an effective transformation coefficient in a frequency band unit by performing scanning independently for each frequency band unit. In detail, referring to FIG. 17A, the effective coefficient encoder 1530 may encode a significance map indicating locations of effective transformation coefficients existing in a transformation residual block 1710, and size and sign information of each effective transformation coefficient, while scanning the entire transformation residual block 1710 according to a predetermined scanning order, for example, a raster scanning order as shown in FIG. 17A. Here, scanning may be skipped in a frequency band unit in which an effective coefficient flag has a value of 0, i.e., a frequency band unit that does not have an effective transformation coefficient.

According to another exemplary embodiment, referring to FIG. 17B, the effective coefficient encoder 1530 may encode significance map and level information of an effective transformation coefficient for each frequency band unit according to a split form of a transformation residual block 1720 split by the frequency band splitter 1510.

Figure 18A:
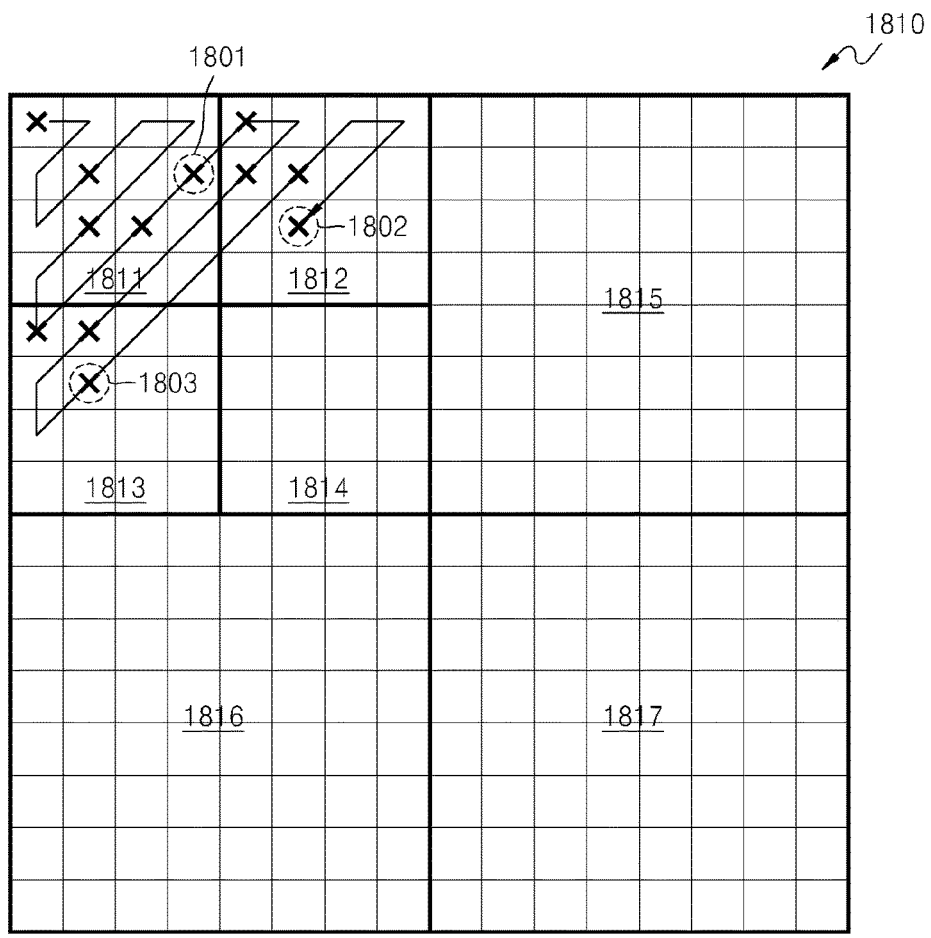
FIGS. 18A and 18B are reference diagrams for describing in detail a process of encoding a residual block, according to an exemplary embodiment.
Figure 18B:
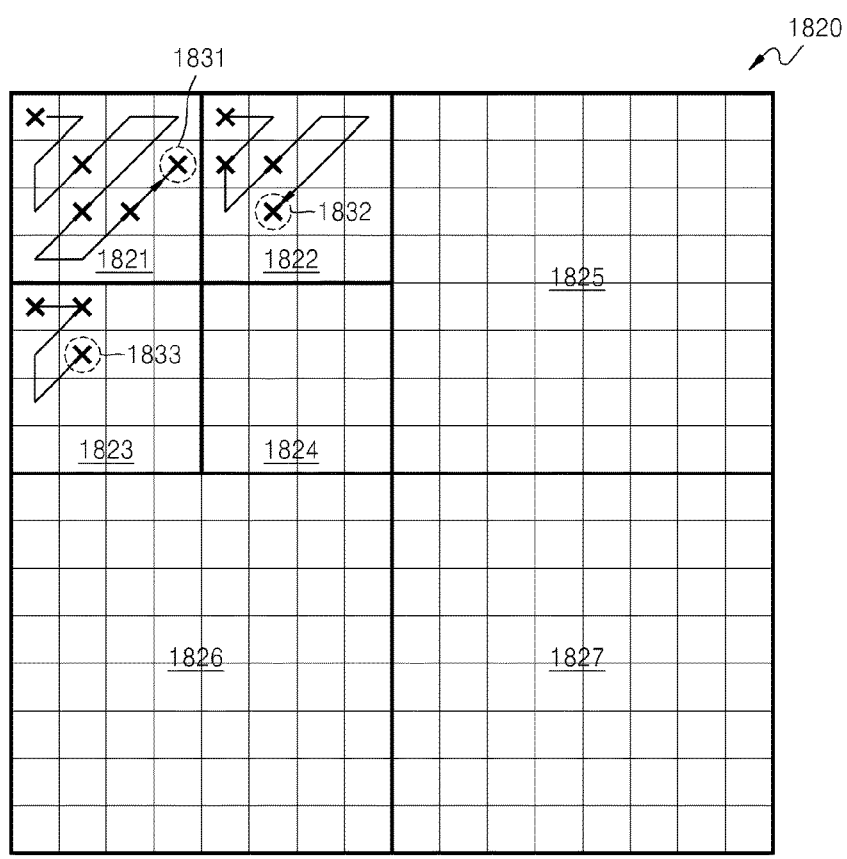

FIGS. 18A and 18B are reference diagrams for describing in detail a process of encoding a residual block, according to an exemplary embodiment. In FIGS. 18A and 18B, a transformation coefficient indicated with x is an effective transformation coefficient, and a transformation coefficient without any indication has a value of 0.

Referring to FIG. 18A, the frequency band splitter 1510 splits a transformation residual block 1810 according to a split form, such as one of the split forms shown in FIGS. 16A through 16J. FIG. 18A shows a split form corresponding to the split form of FIG. 16E, though it is understood that the process with reference to FIG. 18A may also be applied to other split forms. The effective coefficient flag generator 1520 respectively sets effective coefficient flags of frequency band units 1811 through 1813 including effective transformation coefficients as 1, and respectively sets effective coefficient flags of frequency band units 1814 through 1817 that do not include an effective transformation coefficient as 0. The effective coefficient encoder 1530 encodes a significance map indicating locations of the effective transformation coefficients while scanning the entire transformation residual block 1810. As described above, the significance map indicates whether a transformation coefficient according to each scan index is an effective transformation coefficient or 0. After encoding the significance map, the effective coefficient encoder 1530 encodes level information of each effective transformation coefficient, The level information of the effective transformation coefficient includes sign and absolute value information of the effective transformation coefficient. For example, the significance map of the frequency band units 1811 through 1813 including the effective transformation coefficients may have a binary string value, such as "1000100010101110100100100010001," when scanning is performed according to a raster scanning order as shown in FIG. 18A.

Also, when information about the effective transformation coefficient is encoded while scanning the entire transformation residual block 1810 as shown in FIG. 18A, an end-of-block (EOB) flag indicating whether an effective transformation coefficient is the last effective transformation coefficient may be set for the entire transformation residual block 1810 or each frequency band unit. When an EOB flag is set for the entire transformation residual block 1810, only an EOB flag of a transformation coefficient 1802 of the last effective transformation coefficient according to the scanning order from among transformation coefficients of FIG. 18A may have a value of 1. For example, as described above, if the significance map according to FIG. 18A has a value of "1000100010101110100100100010001," an EOB flag corresponding to such a significance map has a value of "000000000001" since only the last effective transformation coefficient from among 12 effective transformation coefficients included in "1000100010101110100100100010001" has a value of 1. In other words, a total of 12 bits are used to express the EOB flag corresponding to the significance map of FIG. 18A.

Alternatively, in order to reduce a number of bits used to express an EOB flag, the effective coefficient encoder 1530 may define a flag (Tlast) indicating whether a last effective transformation coefficient exists according to each frequency band unit, set Tlast as 1 if the last effective transformation coefficient according to each frequency band unit exists and as 0 if the last effective transformation coefficient does not exist, and sets an EOB flag for only a frequency band unit where Tlast is 1, thereby reducing a number of bits used to identify locations of effective transformation coefficients in the entire transformation residual block and the last effective transformation coefficient. In detail, referring to FIG. 18A, the effective coefficient encoder 1530 may check the existence of a last effective transformation coefficient for each of the frequency band units 1811 through 1813 including the effective transformation coefficients, and set Tlast as 1 in the frequency band unit 1812 including the last effective transformation coefficient, and set Tlast as 0 in the remaining frequency band units 1811 and 1813. If each bit of Tlast indicates the existence of the last effective transformation coefficient in each of the frequency band units 1811 through 1813 according to an order of scanning the transformation coefficients, a most significant bit (MSB) of Tlast may indicate whether the effective transformation coefficient exists in a lowest frequency band unit, and a least significant bit (LSB) of Tlast may indicate whether the last effective transformation coefficient exists in the frequency band unit 1812. That is, a bit value of "001" is set since Tlast has a value of 0 for the frequency band unit 1811, 0 for the frequency band unit 1813, and 1 for the frequency band unit 1812. Here, since an effective transformation coefficient in a transformation residual block may end at the frequency band unit 1811 that is the lowest, a Tlast value may not be separately assigned for the frequency band unit 1811. That is, Tlast may be set only for the frequency bands 1812 and 1813 excluding the frequency band 1811 from among the frequency band units 1811 through 1813 that are scanned according to a scanning order. Here, two bit values of "01" are set as Tlast. "0" that is the MSB of "01" indicates that the last effective transformation coefficient of the transformation residual block does not exist in the frequency band unit 1813, and "1" that is the LSB of "01" indicates that the last effective transformation coefficient of the transformation residual block exists in the frequency band unit 1812. Tlast may have a value of "00" if the last effective transformation coefficient of the transformation residual block exists in the frequency band 1811 of the lowest frequency band unit. Thus, when all bits of Tlast are 0, it may be determined that the last effective transformation coefficient of the transformation residual block exists in the frequency band unit 1811.

In the present exemplary embodiment, the effective coefficient encoder 1530 sets an EOB flag only for the frequency band unit in which Tlast is 1, i.e., the frequency band unit including the last effective transformation coefficient of the transformation residual block. Referring to FIG. 18A, the effective coefficient encoder 1530 sets an EOB flag only for each effective transformation coefficient existing in the frequency band unit 1812 in which Tlast is 1. Since a total four effective transformation coefficients exist in the frequency band unit 1812, the EOB flag has four bits of "0001." According to another exemplary embodiment, a total of six to seven bits are used to identify the location of the effective transformation coefficients in the transformation residual block, and the last effective transformation coefficient, since two to three bits are set for Tlast and four bits are set for the EOB flag. Here, five to six bits are saved compared to the previously described exemplary embodiment in which a total of 12 bits are used to set the EOB flag, such as "000000000001."

According to another exemplary embodiment, when an EOB flag is set for each frequency band unit, EOB flags of a transformation coefficient 1801 in the frequency band unit 1811, a transformation coefficient 1802 in the frequency band unit 1812, and a transformation coefficient 1803 in the frequency band unit 1813 are set to 1. EOB flags are not set for the frequency band units 1814 through 1817 that do not include the effective transformation coefficients. As such when an EOB flag is set for each frequency band unit including an effective transformation coefficient, an effective transformation coefficient in a predetermined frequency band unit is scanned, and then an effective transformation coefficient in a following frequency band unit may be scanned. For example, a transformation coefficient in the frequency band unit 1812 may be scanned after the transformation coefficient 1803 of the frequency band unit 1813 is scanned. Referring to FIG. 18B, effective transformation coefficient information is encoded independently for each frequency band unit. The effective coefficient encoder 1530 encodes a significance map indicating locations of effective transformation coefficients, and level information of each effective transformation coefficient while independently scanning each frequency band unit of a transformation residual block 1820. For example, a significance map of a frequency band unit 1821 has a binary string value such as "1000100010011" when scanned according to a raster scanning order as shown in FIG. 18B. Also, the effective coefficient encoder 1530 sets an EOB flag of an effective transformation coefficient 1831 corresponding to a last effective transformation coefficient from among effective transformation coefficients of the frequency band unit 1821 as 1. Similarly, the effective coefficient encoder 1530 generates a binary string value, such as "101010001," as a significance map of a frequency band unit 1822. Also, the effective coefficient encoder 1530 sets an EOB of an effective transformation coefficient 1832 from among effective transformation coefficients in the frequency band unit 1822 as 1. Similarly, the effective coefficient encoder 1530 generates a binary string value, such as "11001," as a significance map of a frequency band unit 1823, and sets an EOB flag of an effective transformation coefficient 1833 as 1.

Meanwhile, the effective coefficient encoder 1530 may separately encode an End_Of_WholeBlock flag indicating a last effective transformation coefficient of the transformation residual block 1820, aside from the EOB flag indicating that the effective transformation coefficients 1831 through 1833 are the last effective transformation coefficients in a corresponding frequency band unit. Referring to FIG. 18B, if the frequency band units 1821 through 1827 are independently scanned in the stated order, the effective transformation coefficient 1833 is the last effective transformation coefficient of the frequency band unit 1823 and, at the same time, the last effective transformation coefficient of the transformation residual block 1820. Accordingly, an EOB flag and an End_Of_WholeBlock flag of the effective transformation coefficient 1833 both have a value of 1. In the effective transformation coefficients 1831 and 1832, which are the last effective transformation coefficients of the frequency band units 1821 and 1822, EOB flags have a value of 1, but End_Of_WholeBlock flags have a value of 0.

As such, when an EOB flag and an End_Of_WholeBlock flag are set for a last effective transformation coefficient according to each frequency band, existence of an effective transformation coefficient in a corresponding frequency band unit may be first determined by using an above-described effective coefficient flag during decoding so as to skip scanning of a frequency band unit, in which an effective coefficient flag is 0. Furthermore, when a transformation coefficient, in which an EOB flag is 1, is scanned while scanning transformation coefficients in a frequency band unit, in which an effective coefficient flag is 1, i.e., a frequency band unit having an effective transformation coefficient, a following frequency band unit may be scanned. When an effective transformation coefficient, in which an EOB flag is 1 and an End_Of_WholeBlock flag is 1, is scanned, effective transformation coefficients of an entire transformation residual block are scanned, and thus scanning of the transformation residual block is ended.

Figure 19A:
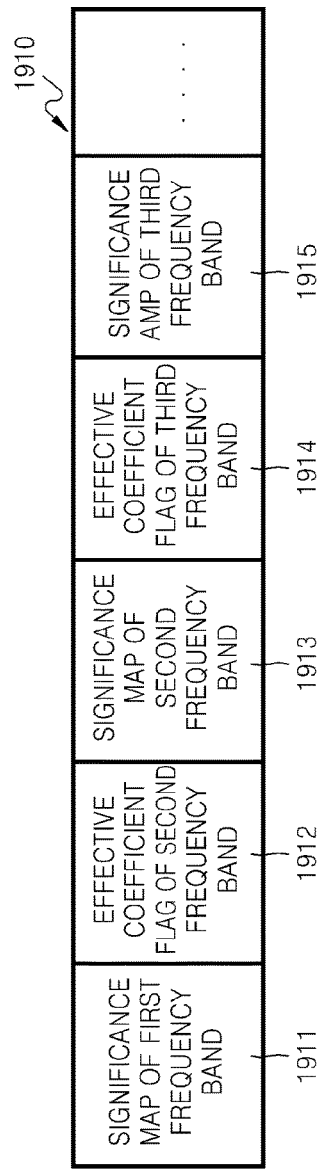
FIGS. 19A and 19B are reference diagrams for describing encoding information of a transformation residual block, which is generated by an effective coefficient encoder, according to one or more exemplary embodiments.
Figure 19B:
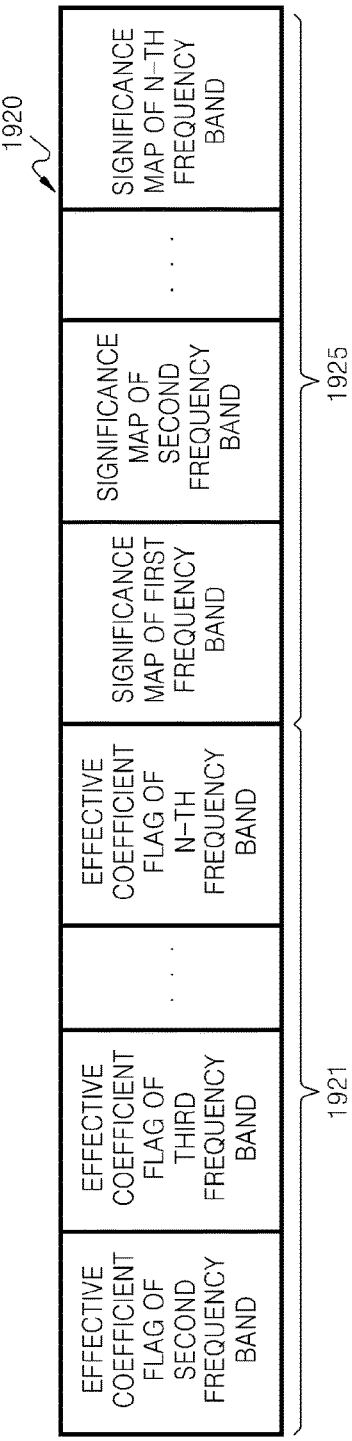

FIGS. 19A and 19B are reference diagrams for describing encoding information of a transformation residual block, which is generated by the effective coefficient encoder 1530, according to one or more exemplary embodiments.

Referring to FIG. 19A, the effective coefficient encoder 1530 may sequentially encode significance maps and pieces of effective coefficient flag information generated according to frequency bands. When a first frequency band is a smallest frequency band of a transformation residual block, only a significance map 1911 of the first frequency band may be encoded and a flag of the first frequency band, which indicates whether an effective transformation coefficient exists in the first frequency band, may not be separately encoded, as shown in FIG. 19A. According to another exemplary embodiment, referring to FIG. 19B, effective coefficient flags 1921 of each frequency band may be first encoded, and then significance maps 1925 of each frequency band may be encoded.

Figure 20:
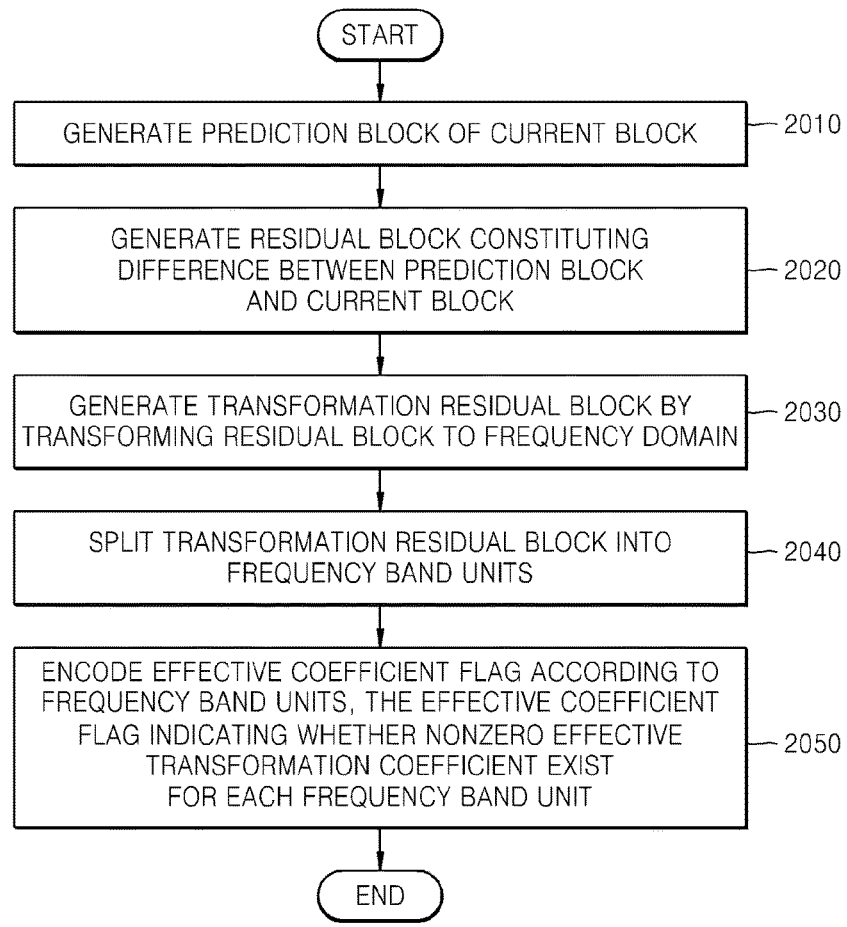
FIG. 20 is a flowchart illustrating a method of encoding a residual block, according to an exemplary embodiment.

FIG. 20 is a flowchart illustrating a method of encoding a residual block, according to an exemplary embodiment.

Referring to FIG. 20, the intra predictor 410 or the motion compensator 425 of FIG. 4 generates a prediction block via inter prediction or intra prediction by using a current block in operation 2010.

In operation 2020, a subtractor generates a residual block that is a difference between the prediction block and the current block.

In operation 2030, the transformer 430 transforms the residual block into a frequency domain to generate a transformation residual block. For example, the residual block may be transformed to the frequency domain via discrete cosine transform (DCT).

In operation 2040, the frequency band splitter 1510 splits the transformation residual block into predetermined frequency band units. As described above, the frequency band splitter 1510 may split the transformation residual block into one of various split forms, for example as shown in FIGS. 16A through 16J. In detail, the frequency band splitter 1510 may split the transformation residual block such that a unit size split in a low frequency band is smaller than a unit size split in a high frequency band, split the transformation residual block by quadrisecting the transformation residual block and repeatedly quadrisecting a smallest low frequency band in the quadrisected transformation residual block, split the transformation residual block into frequency band units having the same size, split the transformation residual block by connecting a horizontal frequency and a vertical frequency having the same value, or determine a split size according to frequency bands of the transformation residual block by using image characteristics of the transformation residual block determined by using transformation coefficients of the transformation residual block, and split the transformation residual block according to the determined split size according to frequency bands.

In operation 2050, the effective coefficient flag generator 1520 generates an effective coefficient flag according to frequency band units, wherein the effective coefficient flag indicates whether a nonzero effective transformation coefficient exists in each frequency band unit. The effective coefficient flag may not be separately generated for a smallest frequency band unit from among the frequency band units of the transformation residual block. Also, the effective coefficient encoder 1530 encodes a significance map indicating locations of the effective transformation coefficients and level information of the effective transformation coefficients with respect to the frequency band units, in which the effective coefficient flags are not 0, i.e., the frequency band units including the effective transformation coefficients, while scanning the transformation residual block according to a predetermined scanning order or independently scanning each frequency band unit, as described above with reference to FIGS. 17A, 17B, 18A, and 18B.

According to a method and an apparatus for encoding a residual block according to one or more exemplary embodiments as described above, information about an effective transformation coefficient may be efficiently encoded according to distribution characteristics of the effective transformation coefficient in a transformation residual block having a size that is greater than or equal to 16×16, by splitting the transformation residual block into frequency band units. Thus, a transformation residual block having a large size is split into frequency band units, and an effective coefficient flag indicating an existence of the effective transformation coefficient is generated according to frequency band units. Accordingly, a scanning process of a frequency band, in which an effective transformation coefficient does not exist in the transformation residual block, may be skipped and a number of bits generated to encode the effective transformation coefficient may be reduced.

Figure 21:
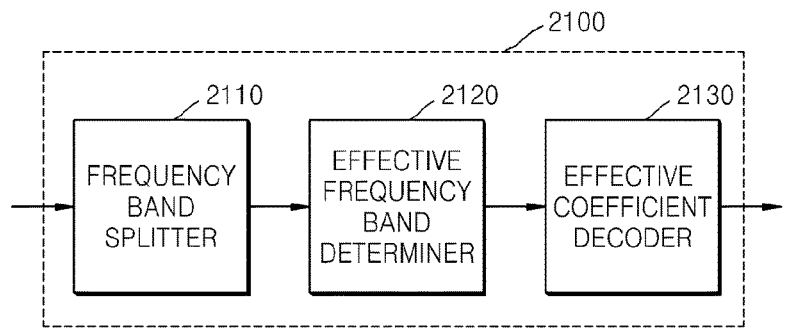
FIG. 21 is a block diagram of an apparatus for decoding a residual block, according to an exemplary embodiment.

FIG. 21 is a block diagram of an apparatus 2100 for decoding a residual block, according to an exemplary embodiment. While not restricted thereto, the apparatus 2100 may correspond to the entropy decoder 520 of FIG. 5 or be included in the entropy decoder 520.

Referring to FIG. 21, the apparatus 2100 includes a frequency band splitter 2110, an effective frequency band determiner 2120, and an effective coefficient decoder 2130.

The frequency band splitter 2110 splits a transformation residual block into predetermined frequency band units. In detail, as described with reference to FIGS. 16A through 16H, the frequency band splitter 2110 may split the transformation residual block in such a way that a unit size split in a low frequency band is smaller than a unit size split in a high frequency band, split the transformation residual block by quadrisecting the transformation residual block and repeatedly quadrisecting a smallest low frequency band in the quadrisected transformation residual block, split the transformation residual block into frequency band units having the same size, split the transformation residual block by connecting a horizontal frequency and a vertical frequency having the same value, or determine a split size according to frequency bands of the transformation residual block by using image characteristics of the transformation residual block determined by using transformation coefficients of the transformation residual block, and split the transformation residual block according to the determined split size according to frequency bands. A split form of the transformation residual block may be predetermined by an encoder and a decoder, though it is understood that another exemplary embodiment is not limited thereto. For example, according to another exemplary embodiment, when a predetermined split index is set for each split form and information about a split index used to split a current transformation residual block is added to a bitstream during encoding, the frequency band splitter 2110 may determine which split form was used to split the current transformation residual block based on the information about the split index included in the bitstream.

The effective frequency band determiner 2120 extracts an effective coefficient flag from a bitstream, wherein the effective coefficient flag indicates whether an effective transformation coefficient exists according to the frequency band units obtained by splitting the transformation residual block. The effective frequency band determiner 2120 may determine a frequency band unit including an effective transformation coefficient from among the frequency band units by using the effective coefficient flag. For example, when the transformation residual block 1820 of FIG. 18B is used, the effective coefficient flags of the frequency band units 1821 through 1823 have a value of 1, and the effective coefficient flags of the frequency band units 1824 through 1827 have a value of 0. Thus, the effective frequency band determiner 2120 may determine the frequency band units including the effective transformation coefficients from the extracted effective coefficient flags according to the frequency bands.

The effective coefficient decoder 2130 decodes the effective transformation coefficients in the frequency band units that are determined to include the effective transformation coefficients by the effective frequency band determiner 2120. In detail, the effective coefficient decoder 2130 extracts a significance map indicating locations of the effective transformation coefficients and level information of the effective transformation coefficients, from the bitstream. Also, as described above with reference to FIGS. 17A and 17B, the effective coefficient decoder 2130 determines the locations of the effective transformation coefficients in the transformation residual block by using the significance map, and restores values of the effective transformation coefficients by using the level information while scanning the entire transformation residual block or scanning each frequency band unit according to a predetermined scanning order that is independent for each frequency band unit.

FIG. 22 is a flowchart illustrating a method of decoding a residual block, according to an exemplary embodiment.

Referring to FIG. 22, in operation 2210, the effective frequency band determiner 2120 extracts an effective coefficient flag from an encoded bitstream, wherein the effective coefficient flag indicates whether an effective transformation coefficient exists according to frequency band units obtained by splitting a transformation residual block of a current block.

In operation 2220, the frequency band splitter 2110 splits the transformation residual block into the frequency band units. As described above with reference to FIGS. 16A through 16J, the frequency band splitter 2110 may split the transformation residual block in such a way that a unit size split in a low frequency band is smaller than a unit size split in a high frequency band, split the transformation residual block by quadrisecting the transformation residual block and repeatedly quadrisecting a smallest low frequency band in the quadrisected transformation residual block, split the transformation residual block into frequency band units having the same size, split the transformation residual block by connecting a horizontal frequency and a vertical frequency having the same value, or determine a split size according to frequency bands of the transformation residual block by using image characteristics of the transformation residual block determined by using transformation coefficients of the transformation residual block, and split the transformation residual block according to the determined split size according to frequency bands. Such a split form may be predetermined with an encoder, or may be determined by using information about a split index separately added to the encoded bitstream. Moreover, it is understood that operations 2210 and 2220 may be switched in order or performed simultaneously or substantially simultaneously.

In operation 2230, the frequency band splitter 2110 determines a frequency band unit including an effective transformation coefficient from among the frequency band units, by using the extracted effective coefficient flag. The effective coefficient decoder 2130 restores the effective transformation coefficient by using a significance map about the frequency band unit determined to include the effective transformation coefficient, and level information of the effective transformation coefficient.

According to one or more exemplary embodiments, an effective coefficient flag indicating existence of an effective transformation coefficient is generated according to frequency band units, so that a scanning process of a frequency band skips a transformation residual block in which an effective transformation coefficient does not exist, and a number of bits generated to encode the effective transformation coefficient is reduced.

While not restricted thereto, an exemplary embodiment can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

While exemplary embodiments have been particularly shown and described, it will be understood by one of ordinary skill in the art that various changes in form and details may be made therein without departing from the spirit and scope of the inventive concept as defined by the following claims. The exemplary embodiments should be considered in a descriptive sense only and not for purposes of limitation. Therefore, the scope of the inventive concept is defined not by the detailed description of the exemplary embodiments, but by the following claims, and all differences within the scope will be construed as being included in the present inventive concept.

What is claimed is:

1. An apparatus for decoding an image, the apparatus comprising:
   a splitter which splits the image into a plurality of maximum coding units, hierarchically splits a maximum coding unit among the plurality of maximum coding units into a plurality of coding units based on split information of a coding unit, and determines a transformation residual block from a coding unit among the plurality of coding units based on split information of the transformation residual block, wherein the transformation residual block includes a plurality of sub residual blocks;
   a parser which:
      obtains, from a bitstream, a coded block flag indicating whether the transformation residual block includes at least one non-zero effective transformation coefficient,
      when the coded block flag indicates that the transformation residual block includes at least one non-zero effective transformation coefficient, obtains, from the bitstream, effective coefficient flags of second sub residual blocks among the plurality of sub residual blocks except a first sub residual block which has lowest frequency band and located on an upper-left side among the plurality of sub residual blocks in the transformation residual block, each of the effective coefficient flags of the second sub residual blocks indicating whether at least one non-zero effective transformation coefficient exists in each of the second sub residual blocks,
      when a particular effective coefficient flag among the effective coefficient flags indicates that at least one non-zero transformation coefficient exists in a particular second sub residual block among the second sub residual blocks, obtains transformation coefficients of the particular second sub residual block based on a significance map indicating a location of the non-zero transformation coefficient in the particular second sub residual block and level information of the non-zero transformation coefficient in the particular second sub residual block obtained from the bitstream,
      when the particular effective coefficient flag indicates that the at least one non-zero effective transformation coefficient does not exist in the particular second sub residual block, determines the transformation coefficients of the particular second sub residual block as zero, and
      when the coded block flag indicates that the transformation residual block includes at least one non-zero effective transformation coefficient, obtains transformation coefficients of the first sub residual block based on a significance map indicating a location of a non-zero transformation coefficient in the first sub residual block and level information of the non-zero transformation coefficient in the first sub residual block obtained from the bitstream; and an inverse-transformer which performs inverse-transformation on the transformation residual block including the first sub residual block and the second sub residual blocks, wherein the transformation coefficients of a sub residual block among the plurality of sub residual blocks are a subset of transformation coefficients of the transformation residual block, wherein each of the effective coefficient flags of the second sub residual blocks except the first residual block is obtained independently from other effective coefficient flags and independent from whether at least one non-zero effective transformation coefficient exists in another sub residual block among the sub residual blocks, wherein the non-zero effective transformation coefficients of the particular second sub residual block determined as having the non-zero effective transformation coefficient based on the effective coefficient flag of the particular second sub residual block, are obtained by performing scanning independently from other second sub residual block, wherein the plurality of sub residual blocks are square and have same size, wherein, when the split information of the coding unit of a current depth indicates a split, the coding unit of the current depth is split into the plurality of coding units of the lower depth, independently from neighboring coding units, and when the split information of the coding unit of the current depth indicates a non-split, one or more transformation residual blocks including the transformation residual block are obtained from the coding unit of the current depth.

* * * * *